US012794604B2

(12) United States Patent
Li et al.

(10) Patent No.: US 12,794,604 B2
(45) Date of Patent: Nov. 10, 2026

(54) METHODS, ARCHITECTURES, APPARATUSES AND SYSTEMS FOR DOWNLINK HYBRID AUTOMATIC REPEAT REQUEST (HARQ) OPERATIONS WITH NETWORK CODING

(71) Applicant: InterDigital Patent Holdings, Inc., Wilmington, DE (US)

(72) Inventors: Yifan Li, Conshohocken, PA (US); Ayesha Ijaz, Guildford (GB); Faris Alfarhan, Montreal (CA); Ahmed Almradi, London (GB); Pascal Adjakple, Great Neck, NY (US); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/647,383

(22) Filed: Apr. 26, 2024

(65) Prior Publication Data

US 2025/0337534 A1 Oct. 30, 2025

(51) Int. Cl.

| | |
|---|---|
| ***H04L 1/00*** | (2006.01) |
| ***H04L 1/1607*** | (2023.01) |
| ***H04L 1/1812*** | (2023.01) |
| ***H04L 1/1829*** | (2023.01) |
| ***H04L 1/1867*** | (2023.01) |

(52) U.S. Cl.

CPC .......... *H04L 1/1896* (2013.01); *H04L 1/0075* (2013.01); *H04L 1/1812* (2013.01); *H04L 1/1861* (2013.01)

(58) Field of Classification Search

None

See application file for complete search history.

(56) References Cited

U.S. PATENT DOCUMENTS

| | | | |
|---|---|---|---|
| 2023/0412346 | A1 | 12/2023 | Liu et al. |
| 2024/0106565 | A1 | 3/2024 | Liu et al. |

FOREIGN PATENT DOCUMENTS

| | | | | |
|---|---|---|---|---|
| WO | WO-2021233929 A1 * | 11/2021 | | ......... H04B 7/15521 |
| WO | WO 2023170584 A1 | 9/2023 | | |
| WO | WO-2023170586 A1 * | 9/2023 | | |

* cited by examiner

*Primary Examiner* — Nishant Divecha
*Assistant Examiner* — James P Seymour
(74) *Attorney, Agent, or Firm* — Mark D. Pratt

(57) ABSTRACT

Procedures, methods, architectures, apparatuses, systems, devices, and computer program products for downlink (DL) hybrid automatic repeat request (HARQ) reporting and network coding (NC) of DL transmissions. A set of service data units (SDUs) may be encoded by a NC process to obtain a plurality of NC protocol data units (PDUs). NC PDUs may be carried by physical downlink shared channel (PDSCH) transmissions to a wireless transmit/receive unit (WTRU). The WTRU may determine HARQ feedback information (e.g., ACK/NACK) for a PDSCH transmission based on physical layer decoding of the PDSCH transmission and NC-related information. For example, code block group (CBG)-based HARQ feedback may be generated based on the NC-related information and a number of NC PDUs or code blocks (CBs) that are incorrectly received. For example, a WTRU may generate HARQ feedback information to indicate the number of NC PDUs or CBs that need to be retransmitted for the PDSCH transmission.

20 Claims, 14 Drawing Sheets

METHODS, ARCHITECTURES, APPARATUSES AND SYSTEMS FOR DOWNLINK HYBRID AUTOMATIC REPEAT REQUEST (HARQ) OPERATIONS WITH NETWORK CODING

TECHNICAL FIELD

The present disclosure is generally directed to the fields of communications, software and encoding, including, for example, to methods, architectures, apparatuses, systems directed to hybrid automatic repeat request (HARQ) procedures with network coding (NC), and more specifically to physical downlink shared channel (PDSCH) scheduling, downlink (DL) HARQ operation, and PDSCH retransmission.

BACKGROUND

In 5G NR, both TB-level and CBG-level HARQ feedback and retransmission are supported. With the introduction of NC to HARQ procedures, a need exists to reduce HARQ feedback overhead, HARQ retransmission overhead, and overall transmission delays.

SUMMARY

In certain representative embodiments, a wireless transmit/receive unit (WTRU) may determine whether to transmit a HARQ acknowledgment/negative acknowledgment (ACK/NACK) based on a physical (PHY) layer decoding of a received PDSCH transmission. The WTRU may use (e.g., additional) NC-related scheduling information received in downlink control information (DCI).

In certain representative embodiments, a WTRU may report (e.g., additional) information to the network so that the network can further adjust a NC coding configuration.

In certain representative embodiments, a WTRU may generates a code block group (CBG)-based ACK or NACK for the HARQ information bits for a PDSCH transmission based on the NC decoding related information and/or based on the number of NC code blocks that are incorrectly received.

In certain representative embodiments, a WTRU may generate HARQ feedback to indicate the number of NC code blocks that need to be retransmitted for a PDSCH transmission and send a report to a base station based on the NC decoding related information and/or the number of NC code blocks that are incorrectly received.

In certain representative embodiments, a WTRU may receive downlink control information (DCI) scheduling a physical downlink shared channel (PDSCH) transmission. The WTRU may receive the PDSCH transmission which includes a plurality of transport blocks (TBs) carrying a plurality of NC protocol data units (PDUs) of a NC generation. The WTRU may generate TB-based HARQ feedback information associated with the PDSCH transmission. For example, the TB-based HARQ feedback information may be based on a comparison of (i) a current total amount of successfully received NC PDUs for the NC generation and (ii) a number of NC PDUs required to successfully receive NC SDUs of the NC generation. The WTRU may send (e.g., report) the TB-based HARQ feedback information associated with the PDSCH transmission.

In certain representative embodiments, a WTRU may receive DCI scheduling a PDSCH transmission. The WTRU may receive the PDSCH transmission which includes a plurality of CBGs. Each of the CBGs may include a plurality of NC PDUs of a NC generation. The WTRU may generate CBG-based HARQ feedback information for the plurality of CBGs. The WTRU may send (e.g., report) the CBG-based HARQ feedback information for the PDSCH transmission.

In certain representative embodiments, a WTRU may receive DCI scheduling a PDSCH transmission. The WTRU may receive the PDSCH transmission which includes a plurality of CBGs. Each of the CBGs may include a plurality of NC PDUSs of a NC generation. The WTRU may generate CBG-based HARQ feedback information for the plurality of CBGs based on an amount of NC service data units (SDUs) recovered from the plurality of NC PDUs of the PDSCH transmission. The WTRU may send (e.g., report) the CBG-based HARQ feedback information associated with PDSCH transmission.

In certain representative embodiments, a WTRU may receive DCI scheduling a PDSCH transmission. The WTRU may receive the PDSCH transmission which includes a plurality of TBs carrying a plurality of NC PDUs of a NC generation. The WTRU may generate 1-bit HARQ feedback information for each TB of plurality of TBs of the PDSCH transmission based on a comparison of (i) a total amount of incorrectly received NC PDUs of the respective TB and (ii) a difference between an amount of the plurality of NC PDUs included in the PDSCH transmission and an amount of NC SDUs of the NC generation. The WTRU may send (e.g., report) the HARQ feedback information for the plurality of TBs of the PDSCH transmission.

In certain representative embodiments, a WTRU may receive information indicating a HARQ feedback type. The WTRU may receive DCI scheduling a PDSCH transmission. The WTRU may receive the PDSCH transmission which includes a plurality of NC PDUs of a NC generation. The WTRU may generate (e.g., TB-based or CBG-based) HARQ feedback information for the PDSCH transmission based on the indicated HARQ feedback type. The WTRU may send (e.g., report) the HARQ feedback information associated with the PDSCH transmission.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGS.) and the detailed description are not to be considered limiting, and other equally effective examples are possible and likely. Furthermore, like reference numerals ("ref.") in the FIGS. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
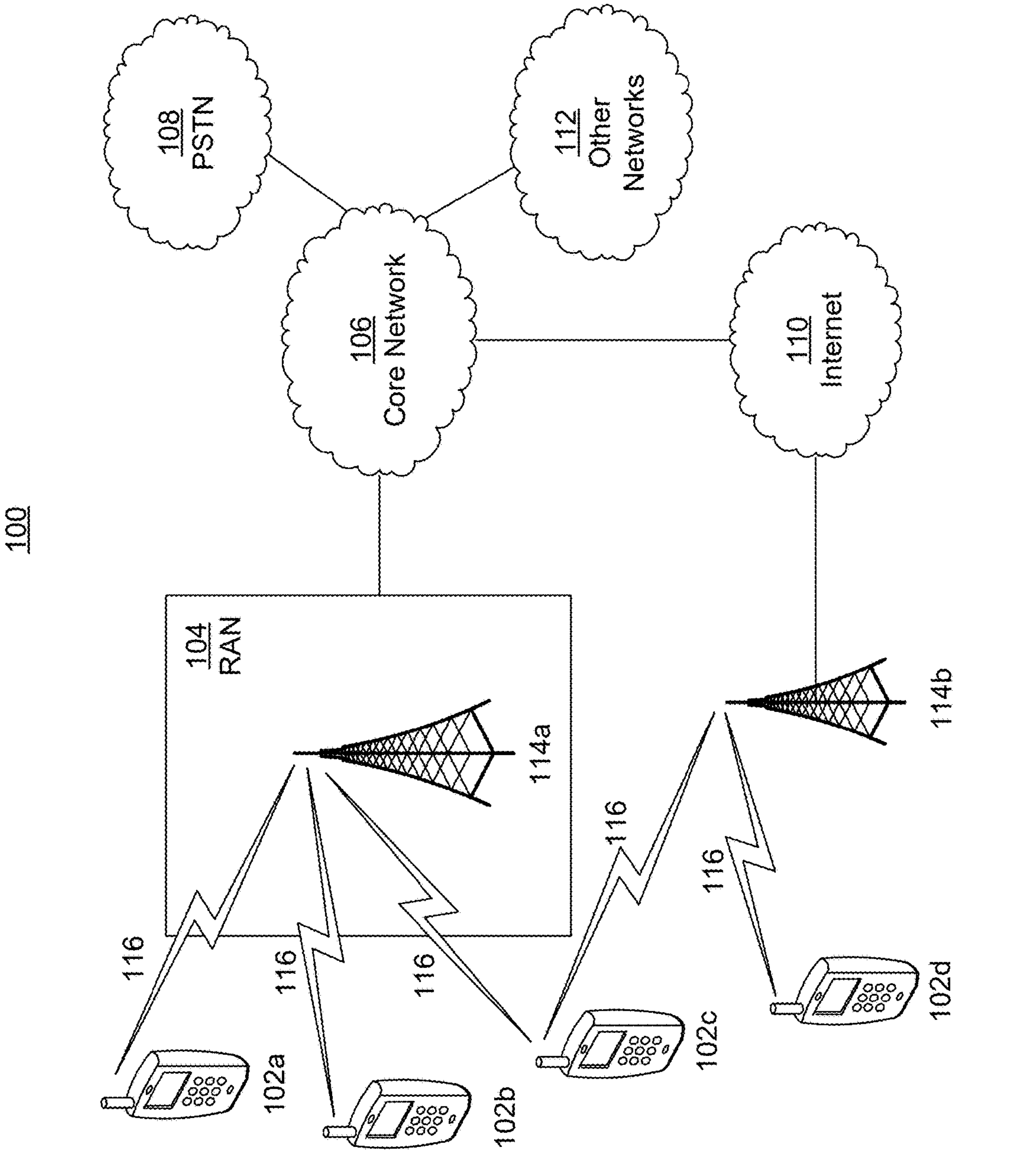
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
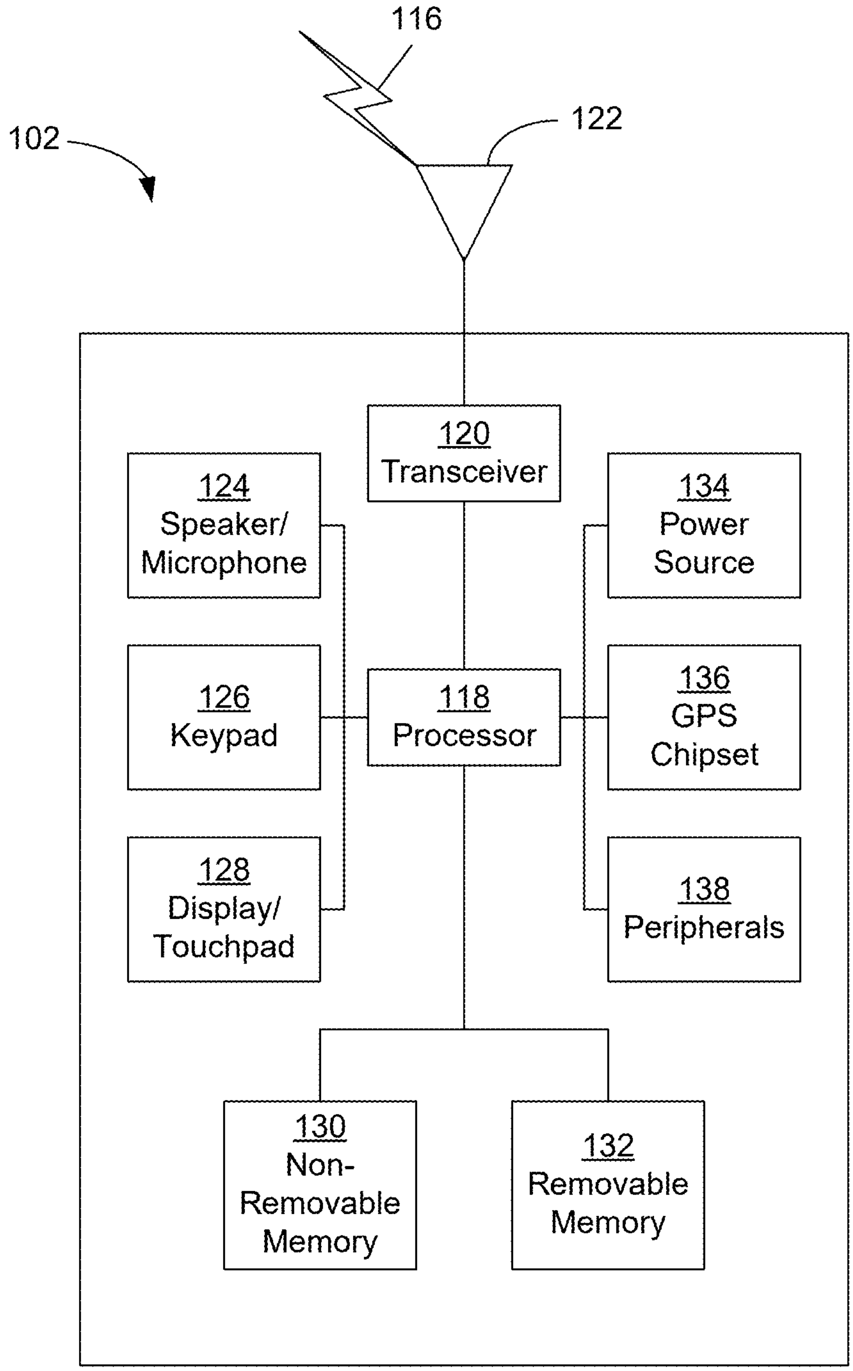
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
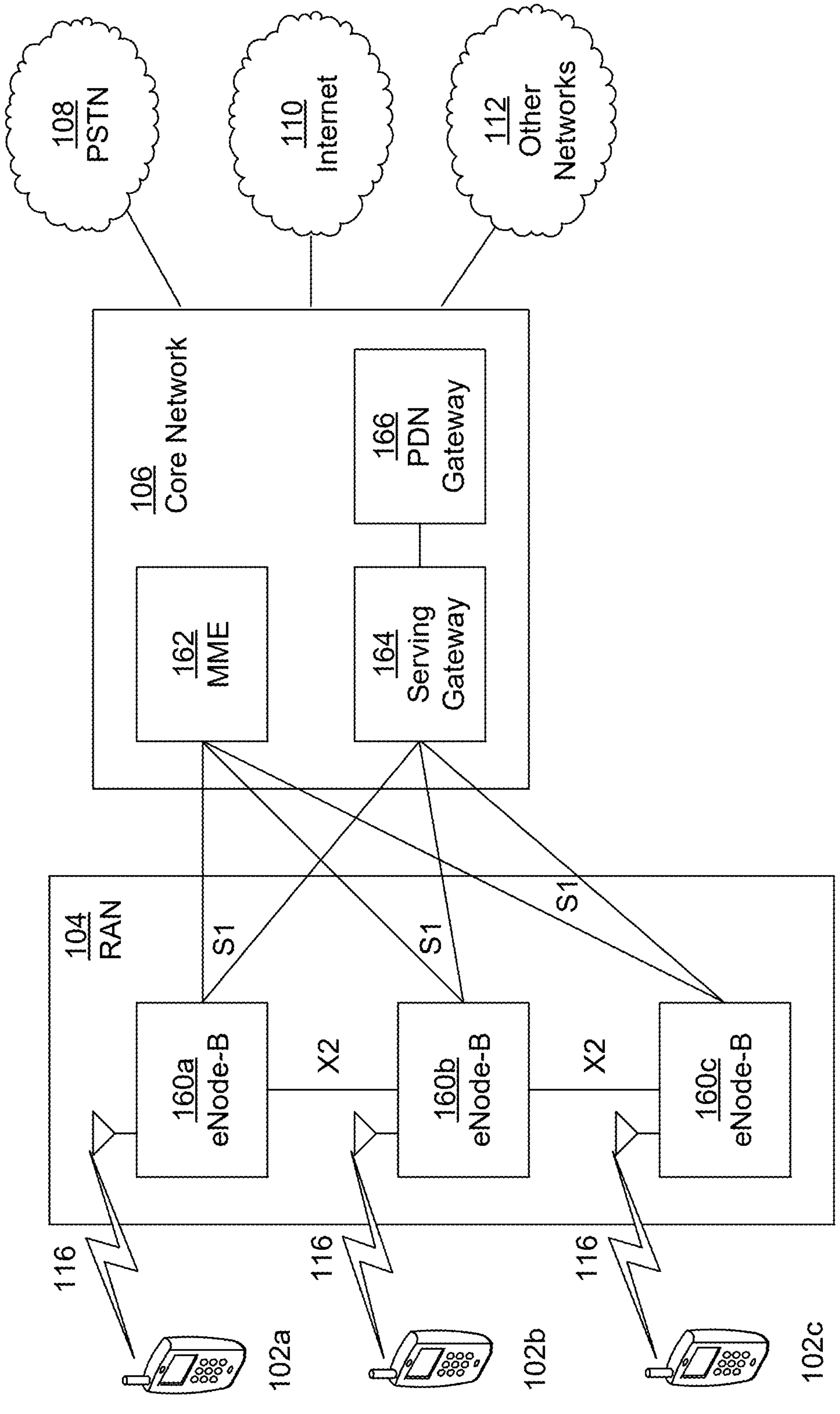
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHZ, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV white space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
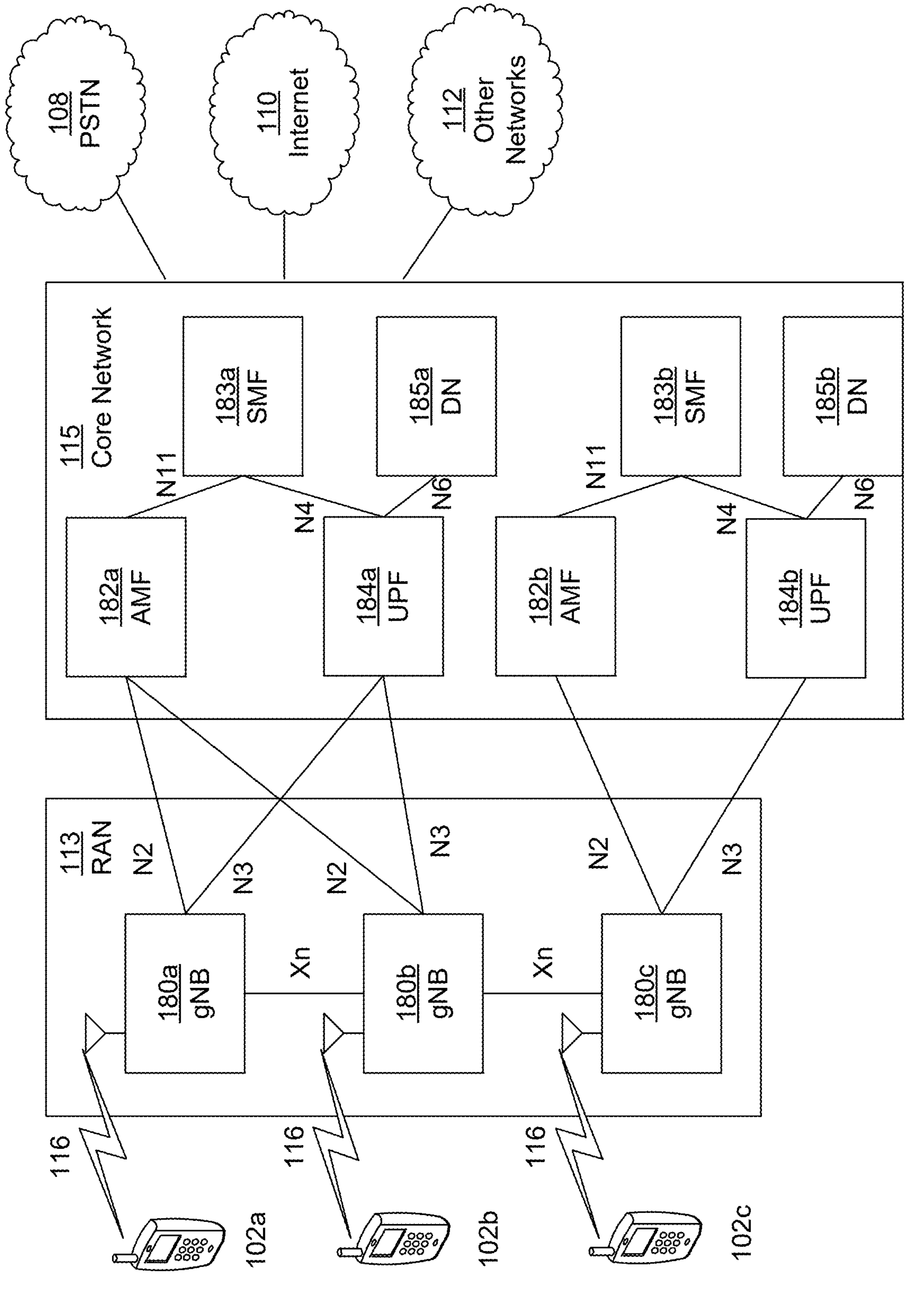
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*,

182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Introduction

The following acronyms and abbreviations may be used herein:

ACK Acknowledgement
CB Code Block
CBG Code Block Group
CE Control Element
CRC Cyclic Redundancy Check
DCI Downlink Control Information
DL Downlink
HARQ Hybrid Automatic Repeat Request
LDPC Low-Density Parity Check
NACK Negative ACK
MAC Medium Access Control
MCS Modulation and Coding Scheme
MIMO Multiple Input Multiple Output
NC Network Coding
NCCB NC code block
NR New Radio
OFDM Orthogonal Frequency-Division Multiplexing
PDCP Packet Data Convergence Protocol
PDSCH Physical Downlink Share Channel
PDU Protocol Data Unit
PHY Physical Layer
RE Resource Element
RRC Radio Resource Control
RV Redundancy Version
SCB Source Code Block
SDU Service Data Unit
TB Transport Block
Tx Transmitter
TBS Transport Block Size
UE User Equipment
UL Uplink
URLLC Ultra Reliable Low Latency Communication Network coding (NC) may refer to packet processing operations that transform X input packet(s), otherwise referred to as "source packet(s)" herein, into Y output packet(s), otherwise referred to as "coded packet(s)" herein. In general, X is greater or equal to 2 and Y is greater or equal to X, with the case X equal to 1 and Y equal to 1 being a special case. The X input packets being coded together may form a NC generation, otherwise referred to as a "generation" herein.

From the perspective of a receiver, when at least X out of the Y transmitted coded packets are received, the transmitted information may be (e.g., capable of being) recovered. As a result, in some scenarios, even if some of the transmitted coded packets fail, the whole transmission may still succeed.

For example, a NC generation may include one or more NC SDUs, or NC SDU segments, as source packets. NC PDUs, as coded packets, may be output from a NC process. Each NC PDU may be a different linear combination of the NC SDUs (or SDU segments) that from the NC generation. Each NC PDU may differ from other NC PDUs associated with the NC generation, as each NC PDU may be a different linear combination of NC SDUs (or SDU segments) of the NC generation.

For example, a first NC PDU is the output of a NC process that performs a linear combination of one or more NC SDUs (or NC SDU segments) of a NC generation using a first set of coefficients. A second NC PDU is the output of NC process that performs a linear combination of one or more NC SDUs (or NC SDU segments) of the NC generation using a second set of coefficients. The first, second and so forth sets of coefficients used to form the linear combinations are different.

In the case of SDU segments, one or more NC SDUs are segmented into NC SDU segments. For example, a NC generation may comprise only NC SDU segments. Reassembly of the NC SDU segments may be performed at the receiver (e.g., decoder) to recover the original NC SDUs.

More specifically, NC may refer to linear NC (e.g., over a finite field), among other features such as recoding aspects. In linear NC, packet alphabet A is a q-element finite field $F_g$, or more generally, a space of row vectors over $F_q$. In a packetized communication network, each packet p can be represented by an m-dimensional (row) vector over a finite field $F_g$, (e.g., a vector of m elements or symbols from the finite field $F_q$). In other words, the bits in each packet are grouped into symbols of size s bits from $F_q$, $q=2^s$. Each packet may be considered as a vector of m symbols from $F_q$, each symbol being of size s. This vector may be referred to as a packet vector. Herein, the term packet and packet vector may be used interchangeably. Due to the algebraic nature of this construction, it is possible to perform algebraic operations among different packets (e.g., vectors) to obtain a new packet in the vector space. Such ability yields the linear network coding capability of the network. The linear network combination refers to the mode of transmission of any network node where any linear combination of a set $\{p_i\}_{1\le i\le k}$, of available packets can be formed. Specifically, we have $$c = \sum_{i\ge 1}^{k} g_i p_i \tag{1}$$

where $g_i \in F_q$, for each i constitute the coding coefficients, and k represents the number of packets being linearly combined to form a coded packet. It should be noted that the coding coefficients $g_i$ may be randomly selected, in which case the network coding scheme may be referred to as random linear NC. Assuming a time-slotted system operation, the linear combination of a set of available packets in time slot t can be formed as:

$$c[t] = \sum\nolimits_{i\ge 1}^{k} g_i[t] p_i. \tag{2}$$

For the sake of simplicity, we may ignore the reference to the time instance of a linear combination of packets and describe a linear combination of packets as per the equation (1) above.

Expanding on the above, let $p_1, \ldots, p_k$ denote the packet vectors to be encoded, which are length-m row vectors of symbols from $F_q$. We denotes by P the k*m matrix whose ith row is $p_i$. Let $C_r$ be the matrix whose rows are given by the r's coded packet vectors. P and $C_r$ are linearly related by a matrix equation $$C_r = G_r P. \tag{3}$$

The matrix $G_r$ is the matrix of the coding coefficients, with k columns and r rows, where each coding coefficient is an element of the finite filed $F_q$. This matrix may be referred to herein as the generator matrix, generation matrix, or the transfer matrix.

It should be noted that the row space of $C_r$ is a subspace of the row space of P. If the receiver receives k linearly independent packets, it can recover the row space of P, that is the receiver can recover the encoded packet $p_1, \ldots, p_k$, if it received k linearly independent coded packets out of f coded packets. Let $$C(F_q^m)$$

denote the set of all subspaces of $$F_q^m.$$

A codeword corresponds to a nonempty subset of $$c(F_q^m),$$

and each codeword is a subspace of $$F_q^m.$$

In other words, a codeword is any subset of coded packets that can be generated as a linear combination of packet $p_1, \ldots, p_k$. A codeword may be transmitted as a batch of k packets; the k packet vectors representing the packets being encoded together in the batch form a generating set for the corresponding subspace (or its orthogonal complement). The terms generating set, input packets generation, generation of input packets or generation may be used interchangeably. The term "set of packets being coded together" or "set of packets being encoded together" should be understood as the set of packets used as input to the (en)coding operation, independently of the fact that these source packets have been selected for linear combinations. It is natural to consider codes whose codewords all have the same dimension k. Therefore, codewords of particular interest are any matrix $C_r$ of coded packets, with r number of rows such as r≥k. For a binary field extension, a codeword may be defined by the parameters m, s, k and r, where mis the length expressed in number of symbols of row vectors (i.e. coded packets) in the codeword, s is the symbol size, k is the generation size (e.g., the number of packets being coded together), r is the number of rows in the generator matrix (e.g., the number of coded packet vectors). In the case of a binary extension field with characteristic u=2, it should be noted that if a packet is of size L bits, L=m*s bits, where s is the size of a symbol in the finite filed $F_{2^s}$.

Let M denote the maximum length of a packet vector i.e. the maximum number of symbols in a packet. A codebook is defined herein as all possible codewords from $$C(F_q^M).$$

A codebook may also be associated with a maximum R number of rows. Let $G_R$ denote the generator matrix associated with the largest possible codeword $C_R$, by the equation $c_R=G_RP$. The generator matrix $G_R$ comprises K columns and R rows where, K is an upper bound to the maximum generation size (e.g., the maximum number of packets to be encoded together) and R is an upper bound to the maximum number of rows (the maximum number of coded packets that can be generated). An example of a codeword defined by the linear combination $c_r=G_rP$ follows below. Each element in the matrixes $c_r$, $G_r$, and P, is an element (e.g., symbol) from the finite filed $F_g$. In the case of a binary extension field $F_{2^s}$, each symbol is s bits long. It should be noted that since each packet (or packet vector) is just an appended set of Galois field elements or symbols, the operations of multiplication (or division) and addition (or subtraction) are performed symbol-wise over each of the individual symbols of the packets. The size of an encoding vector associated with a coded packet $c_l$ is k*s bits where k is the generator size and s is the symbol size in bits. The matrix P of packets to be encoded is characterized by the parameter m, s and k, where m is the length expressed in number of symbols of row vectors (i.e. coded packets) in the codeword, s is the symbol size, k is the generation size (e.g., the number of packets being coded together). The expanded form of the codeword defined by $C_r=G_rP$ may be expressed as the following:

$$\begin{pmatrix} c_{1,1} & \cdots & c_{1,l} & \cdots & c_{1,m} \\ \vdots & \vdots & \vdots & \vdots & \vdots \\ \vdots & \vdots & \vdots & \vdots & \vdots \\ \vdots & \vdots & \vdots & \vdots & \vdots \\ c_{k,1} & \vdots & c_{k,l} & \vdots & c_{k,m} \\ c_{k+1,1} & \vdots & c_{k+1,l} & \vdots & c_{k+1,m} \\ \vdots & \vdots & \vdots & \vdots & \vdots \\ \vdots & \vdots & \vdots & \vdots & \vdots \\ c_{r,1} & \cdots & c_{r,l} & \cdots & c_{r,m} \end{pmatrix} = \begin{pmatrix} g_{1,1} & \cdots & g_{1,i} & \cdots & g_{1,k} \\ \vdots & \vdots & \vdots & \vdots & \vdots \\ \vdots & \vdots & \vdots & \vdots & \vdots \\ \vdots & \vdots & \vdots & \vdots & \vdots \\ g_{k,1} & \cdots & g_{k,i} & \cdots & g_{k,k} \\ g_{k+1,1} & \cdots & g_{k+1,i} & \cdots & g_{k+1,k} \\ \vdots & \vdots & \vdots & \vdots & \vdots \\ \vdots & \vdots & \vdots & \vdots & \vdots \\ g_{r,1} & \cdots & g_{r,i} & \cdots & g_{r,k} \end{pmatrix} \begin{pmatrix} p_{1,1} & \cdots & p_{1,l} & \cdots & p_{1,m} \\ \vdots & \vdots & \vdots & \vdots & \vdots \\ p_{i,1} & \vdots & p_{i,l} & \vdots & p_{i,m} \\ \vdots & \vdots & \vdots & \vdots & \vdots \\ p_{k,1} & \cdots & p_{k,l} & \cdots & p_{k,m} \end{pmatrix}$$

The set of packets $\{p_i\}_{1\le i\le k}$ being considered for a linear combination to form a coded packet (e.g., the set of source packets used an input to the encoding operation) may be denoted as a packet block or an (en)coding window. The block size k is the number of packets in the set of packets being coded together (e.g., the size of the (en)coding window). The size may change over time. The block size is equal to the size of the generator matrix G. In a fixed block coding, the block size k is fixed. In a variable block coding, the block size k is dynamic.

A sliding window coding can also be performed, where the coding is performed across a dynamic set of packets. Packets to be encoded (e.g., source packets) can be added or removed from the sliding window dynamically. The sliding window can be of a fixed block size or of a variable block size (e.g., a sliding window coding can be performed based on a variable block size or a fixed block size).

The decoding window is similar to the (en)coding window but from the perspective of the receiver. For example, the set of source packets that are considered in the current linear system of the receiver may be independent of the fact that these source packets have been received, decoded or lost. The size of the decoding window is the number of source packets in the current decoding window. The size may change over time.

In NR, there is one independent hybrid-ARQ entity per serving cell and one transport block is generated per assignment or grant per serving cell. The MAC entity includes a HARQ entity for each serving cell, which maintains a number of parallel HARQ processes. Each HARQ process is associated with a HARQ process identifier.

NR supports both TB-level and CBG-level HARQ feedback and retransmission. For TB-level HARQ feedback, a 1 bit ACK/NACK is reported for a whole TB. When CBG-level HARQ feedback is configured, a HARQ bitmap is reported where each bit is associated with one CBG. A retransmission may also be performed with CBG granularity based on the reported HARQ bitmap (e.g., ACK/NACK information).

Figure 2:
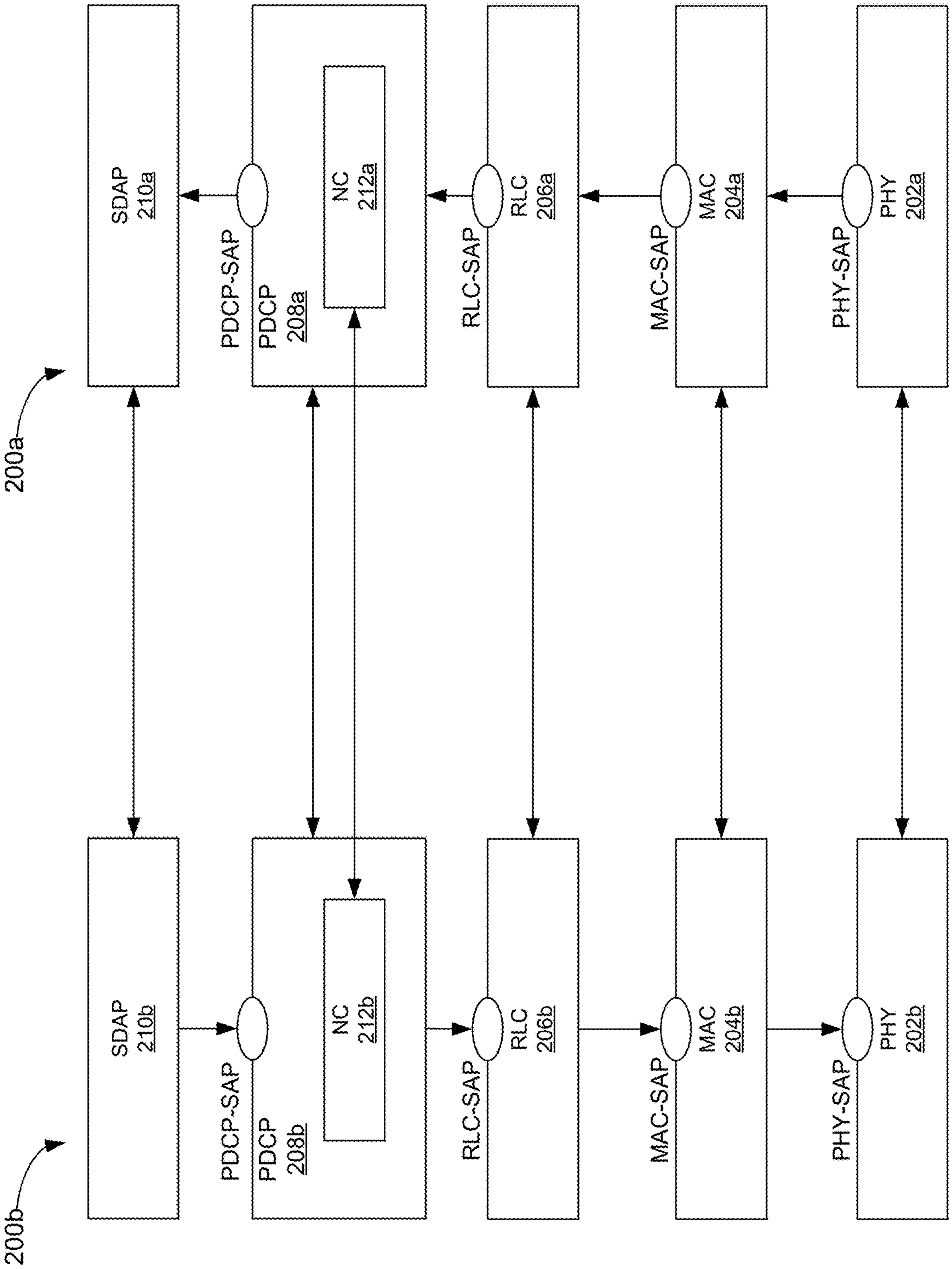
FIG. 2 is a protocol layer diagram illustrating NC as a protocol in a PDCP layer.

FIG. 2 is a protocol layer diagram illustrating NC as a protocol in a PDCP layer. The introduction of NC in the RAN protocol as shown in FIG. 2 may lead to an increase in HARQ feedback overhead, HARQ retransmission overhead, and overall transmission delay incurred at the HARQ level since Y packets are transmitted instead of X with Y≥X. Therefore, enhancements are desirable for reduction of:

HARQ feedback overhead;

HARQ retransmission overhead; and

Overall transmission delay.

In FIG. 2, at a receiver side 200*a* a protocol stack may include a physical (PHY) layer 202*a*, a medium access control (MAC) layer 204*a*, a radio link control (RLC) layer 206*a*, a packet data convergence protocol (PDCP) layer 208*a*, and a service data adaptation protocol (SDAP) layer 210*a*. At a transmitter side 200*b* a protocol stack may include a PHY layer 202*b*, a MAC layer 204*b*, a RLC layer 206*b*, a PDCP layer 208*b*, and a SDAP layer 210*b*. At the PDCP level of the protocol stack, an NC encoding entity 212*b* may be implemented at the transmitter side 200*b* and NC decoding entity 212*a* may be implemented at the receiver side 200*a*.

In certain representative embodiments, NC PDUs and/or PDU sets which are output from an activated PDCP NC entity may belong to a same NC generation and may have different characteristics (e.g., types and/or importance levels). The NC PDUs and/or PDU sets may be multiplexed into different TBs based on their characteristics. For example, different TBs may carry correlated and/or dependent NC PDUs, or PDU sets, from one NC generation. For DL transmissions, a WTRU may provide HARQ feedback which may minimize HARQ retransmission overhead and increase processing performance and improve cell capacity.

Overview

In certain representative embodiments, for DL transmission, a WTRU may report HARQ feedback to minimize HARQ retransmission overhead and/or improve cell capacity by leveraging the fact that only X out of Y transmitted packets may need to be successfully received at a receiver.

In certain representative embodiments, a WTRU may determine whether to transmit HARQ-ACK/NACK feedback based on PHY layer decoding of a received PDSCH and additional NC-related scheduling information (e.g., an identifier and/or sequence number of an NC generation, a minimum number of NC PDUs required to recover the NC SDUs of the NC generation, a total number (e.g., total amount) of NC PDUs for the NC generation that the base station plans to transmit to the WTRU 102, etc.) received in a DCI before decoding at the PDCP level. The WTRU may report information to the network so that the network may adjust a NC coding configuration (e.g., NC code rate, generation size, etc.).

In certain representative embodiments, a WTRU may (e.g., need to) generate and transmit a HARQ codebook.

For example, if the total number of successfully decoded NC PDUs of a NC generation in all the received TBs is greater than or equal to the minimum number of NC PDUs required to recover the NC SDUs of the NC generation, the WTRU may generate and transmit TB-based HARQ ACK information to a base station (e.g., gNB 180) for all the received TBs associated with the NC generation (e.g., within the current HARQ codebook generation period). For example, one-bit ACK feedback may be generated and transmitted by the WTRU 102 to the base station for a whole NC PDU set (e.g. to save the HARQ feedback signaling overhead).

For example, if the total number of successfully decoded NC PDUs of the NC generation in all the received TBs is less than the minimum number of NC PDUs required to recover NC SDUs of the NC generation, and if the total number of NC PDUs that are expected to be received in the following PDSCH transmissions of the NC generation is greater than or equal to the additional number of NC PDUs required to recover the NC SDUs, the WTRU may generate and transmit TB-based HARQ ACK information to the base station for the all the received TBs associated with the NC generation (e.g., within the current HARQ codebook generation period).

For example, if the total number of successfully decoded NC PDUs of the NC generation in all the received TBs is less than the minimum number of NC PDUs required to recover the NC SDUs of the NC generation, and if the total number of NC PDUs that are expected to be received in the following PDSCH transmissions of the NC generation is less the additional number of NC PDUs required to recover the NC SDUs, the WTRU may (e.g., for the NC generation) generate and transmit TB-based HARQ NACK information to the base station for the failed TBs (e.g., a TB of the PDSCH transmission may fail a CRC check and any NC PDUs carried by the TB may be considered to have failed) that are carrying NC PDUs with a higher importance (e.g., systematic packets, innovative packets, etc.), such as until retransmission requests (e.g., NACKs) for enough NC PDUs (e.g., to obtain the NC SDUs) has been satisfied. As an example, if not enough retransmission request for NC PDUs has been done, the WTRU may generate and transmit TB-based HARQ NACK information to the base station for the failed TBs that are carrying the NC PDUs with a lower importance, (e.g., redundant packets, less innovative packets, non-systematic packets, etc.) until retransmission request for enough NC PDUs has been done. As an example, the WTRU may generate and transmit TB-based HARQ ACK information to the base station for any remaining TBs (e.g., of the NC generation).

In certain representative embodiments, a WTRU may be configured with (e.g., to provide) TB-based HARQ feedback. The WTRU may receive DL scheduling information (e.g., via DCI) from a base station (e.g., gNB 180) that includes information indicating any of the following:

- an identifier and/or sequence number of an NC generation;
- a minimum number of NC PDUs required to recover the NC SDUs of the NC Generation (e.g., otherwise denoted as X herein);
- a total number (e.g., total amount) of NC PDUs for the NC generation that the base station plans to transmit to the WTRU 102 (e.g., otherwise denoted as Y herein); and/or
- a number of NC PDUs that will be transmitted in the PDSCH scheduled by the DCI for the NC generation whose identifier is indicated by the scheduling DCI (e.g., otherwise denoted as N herein).

The WTRU may, such as where the WTRU 102 has no record of the NC generation (e.g., identifier), the WTRU 102 may perform the following:

- initialize the current total number of successfully received NC PDUs (e.g., otherwise denoted as $N_r$ herein) for this NC generation to 0; and/or
- initializes the current total number of transmitted NC PDUs by the base station (e.g., denoted as $N_t$ herein) for this NC generation to 0.

The WTRU may receive the PDSCH transmission scheduled by the DCI. The WTRU 102 may update the current total number of transmitted NC PDUs by the base station $N_t$ by adding N to it (e.g., the number of NC PDUs indicated to be transmitted in the PDSCH scheduled by the scheduling DCI for the NC generation whose identifier is indicated by the scheduling DCI).

For example, the WTRU may successfully decode the received PDSCH scheduled by the DCI, and may update the current total number of successfully received NC PDUs $N_r$ for the NC generation identified by the scheduling DCI by adding N to it (e.g., the number of NC PDUs indicated to be transmitted in the PDSCH scheduled by the scheduling DCI for the NC generation whose identifier is indicated by the received scheduling DCI). For example, the WTRU 102 may fail to decode the received PDSCH, the WTRU 102 may keep (e.g., not update) the current total number of successfully received NC PDUs $N_r$ as the current value.

The WTRU 102 may generate TB-based HARQ feedback for the received PDSCHs. For example, the WTRU 102 may generate the TB-based HARQ feedback based on an enhanced HARQ feedback generation rule.

- As an example, if $N_r$, the current total number of successfully received NC PDUs of the NC generation identified by the scheduling DCI, is greater than or equal to the minimum number of NC PDUs required to recover the NC SDUs of the NC generation identified by the scheduling DCI, (e.g., if $N_r \geq X$), the WTRU 102 may generate TB-based HARQ ACK feedback for each TB of all the received TBs associated with the NC generation.

As another example, if $N_r$, the current total number of successfully received NC PDUs of the NC generation identified by the scheduling DCI, is less than the minimum number of NC PDUs required to recover the NC SDUs of the NC generation identified by the scheduling DCI, and if the total number of NC PDUs that is/are expected to be received in any following PDSCHs of the NC generation is greater than or equal to the additional number of NC PDUs required to recover the NC SDUs (e.g., if $N_r<X$ and $N_r+Y-N_t>X$), the WTRU 102 may generate TB-based HARQ ACK feedback for each TB of all the received TBs associated with the NC generation.

As another example, if Ny, the current total number of successfully received NC PDUs of the NC generation identified by the scheduling DCI, is less than the minimum number of NC PDUs required to recover the NC SDUs of the NC generation identified by the scheduling DCI, and if the total number of NC PDUs that is/are expected to be received in any following PDSCHs of the NC generation is also less than the additional number of NC PDUs required to recover the NC SDUs (e.g., if $N_r<X$ and $N_r+Y-N_t<X$, for the NC generation), the WTRU 102 may generate TB-based HARQ feedback for the received PDSCHs as follows:

- generate TB-based HARQ NACK feedback for each TB of the failed TBs that are carrying any NC PDUs with high importance (e.g., systematic packets, innovative packets, etc.) until retransmission requests for enough NC PDUs have been met (e.g., until $N_r+Y-N_t+N_{reTx}>X$, where $N_{reTx}$ denotes the total number of NC PDUs carried by the PDSCH for which NACK has been generated);
- if retransmission requests for enough NC PDUs has not been met (e.g., if $N_r+Y-N_t+N_{reTx}<X$), the WTRU 102 may generate TB-based HARQ NACK feedback for each TB of the failed TBs that are carrying NC PDUs with low importance, (e.g., redundant packets, less innovative packets, non-systematic packets, etc.) until retransmission requests for enough NC PDUs have been met (e.g., until $N_r+Y-N_t+N_{reTx}\geq X$); and/or.
- generates TB-based HARQ ACK for each TB of the remaining TBs.

The WTRU 102 may transmit the TB-based HARQ-ACK codebook (e.g., as described above) to the base station.

Common Aspects

As used herein, a network encoding operation may refer to the process of a transmission node (e.g., transmitter) applying a NC scheme to encode a first set of X input packets (e.g., NC SDUs) to generate a second set of Y output packets (e.g., NC PDUs).

As used herein, a NC generator may refer to an encoding matrix used in one NC generation to generate the NC PDUs. Assuming Y NC PDUs are generated in one NC generation, the corresponding NC generator can be expressed as a Y by X matrix, where each row contains coding coefficients selected for this generation to generate an NC PDU. As used herein, the terms NC generator, generator, NC generator matrix, generator matrix may be used interchangeably.

As used herein, a Codepoint may refer to any combination of the bit values that a bit string can represent and convey. For example, a 2-bit string can convey 4 different codepoints: '00', '01', '10' and '11'. In a wireless system, each codepoint may be associated with a certain information or meaning with it. In a particular transmission, one codepoint is transmitted for this bit string and the corresponding information is signaled.

As used herein, the terms "to recover the NC SDUs", "recover NC SDUs", "recovered NC SDUs" and other variations thereof may be used interchangeably in reference to (e.g., a receiver) recovering NC SDU(s) as a result of a successful decoding of received PDUs. The received PDUs are generated (e.g., at a transmitter) based on a NC generation formed by the NC SDU(s). For example, the NC SDUs are used as input to an NC encoding process (e.g., at the transmitter).

As used herein, the terms successfully received NC PDU and correctly received NC PDU may be used interchangeably to refer to where the TB carrying the PDU has been successfully decoded.

As used herein, the term incorrectly received NC PDU may refer to where the TB carrying the PDU has not been successfully decoded.

As used herein, the term NC SDU may refer to an input unit of an NC encoding process. For example, a set of NC SDUs may form an NC generation. An NC SDU is an element of the set of NC SDUs.

As used herein the term NC PDU may refer to an output unit of an NC encoding process. For example, a set of NC PDUs may be generated using an NC generation.

As used herein, the term a NC PDU of a NC generation and a NC PDU for a NC generation may refer to a NC PDU which is generated using a NC generation (e.g., X NC SDUs used as inputs for a NC encoding process may provide Y NC PDUs as an output of the NC encoding process).

As used herein, the term number may be used to refer to an amount or quantity.

As used herein, the term configured with may refer to scenarios where a WTRU 102 receives a configuration from a base station or another node (e.g., group coordinator WTRU 102). For cases where the WTRU 102 receives a configuration from a gNB 180, the WTRU 102 may receive a dedicated RRC configuration or SIB from the gNB. For cases where the WTRU 102 receives a configuration from another node, the WTRU 102 may receive the configuration via sidelink communication (e.g., PC5 RRC). For example, a WTRU 102 may be configured or pre-configured to perform an action, such as where the WTRU 102 is hard coded to perform the action, such as via standard specifications.

Procedures for Determining Information Used for Enhanced HARQ Feedback Generation Rules In certain representative embodiments, a WTRU may receive NC PDU related information in a scheduling DCI or other control information from the network.

In certain representative embodiments, a WTRU may receive a DCI, scheduling a PDSCH transmission, containing any of the following information: (i) an identifier and/or sequence number of an NC generation, (ii) a minimum number of NC PDUs required to recover the NC SDUs of the NC Generation (e.g., denoted as X), (iii) a total number (e.g., total amount) of NC PDUs generated using the NC generation that the base station plans to transmit to the WTRU 102 (e.g., denoted as Y), (iv) a number (e.g., an amount) of NC PDUs that will be transmitted in the PDSCH scheduled by the DCI (e.g., for the NC generation whose identifier is indicated by the scheduling DCI) (e.g., denoted as N), and/or (v) one or more types of NC PDUs carried in the PDSCH.

For example, a WTRU 102 may be configured to receive NC PDUs from one NC generation in a TB received in a PDSCH and the scheduling DCI may carry the identifier of the corresponding NC generation.

For example, a WTRU 102 may be configured to receive NC PDUs from more than one NC generation in a TB received in a PDSCH and the scheduling DCI may carry identifiers of all NC generations whose associated NC PDUs are scheduled for transmission to the WTRU 102 in the PDSCH scheduled by the received DCI.

For example, a WTRU 102 may be configured to receive NC PDUs generated using one NC generation in a TB received in a PDSCH and the scheduling DCI may have a field or other information indicating a value of X associated with the NC generation whose NC PDUs are scheduled for transmission in the PDSCH scheduled by the DCI.

For example, a WTRU 102 may be configured to receive NC PDUs from more than one NC generation in a TB received in a PDSCH and the WTRU 102 may receive one value of X applicable to all the NC generations whose associated NC PDUs are scheduled for transmission in the PDSCH scheduled by the DCI.

For example, a WTRU 102 may be configured to receive NC PDUs generated using more than one NC generation in a TB received in a PDSCH and the WTRU 102 may receive a different value of X for each NC generation whose associated NC PDUs are scheduled for transmission in the PDSCH scheduled by the DCI.

For example, a WTRU 102 may be configured to receive NC PDUs generated using one NC generation in a transport block (TB) received in a PDSCH and the scheduling DCI may have a field or other information indicating a value of Y associated with the NC generation whose NC PDUs are scheduled for transmission in the PDSCH scheduled by the DCI.

For example, a WTRU 102 may be configured to receive NC PDUs generated using more than one NC generation in a TB received in a PDSCH and the WTRU 102 may receive one value of Y applicable to all the NC generations whose associated NC PDUs are scheduled for transmission in the PDSCH scheduled by the DCI.

For example, a WTRU 102 may be configured to receive NC PDUs generated using more than one NC generation in a TB received in a PDSCH and the WTRU 102 may receive a different value of Y for each NC generation whose associated NC PDUs are scheduled for transmission in the PDSCH scheduled by the DCI.

For example, a WTRU 102 may be configured to receive NC PDUs generated using one NC generation in a TB received in a PDSCH and the scheduling DCI may have a field or other information indicating a value of N associated with the NC generation whose NC PDUs are scheduled for transmission in the PDSCH scheduled by the DCI.

For example, a WTRU 102 may be configured to receive NC PDUs generated using more than one NC generation in a TB received in a PDSCH and the WTRU 102 may receive one value of N applicable to all the NC generations whose associated NC PDUs are scheduled for transmission in the PDSCH scheduled by the DCI.

For example, a WTRU 102 may be configured to receive NC PDUs generated using more than one NC generation in a TB received in a PDSCH and the WTRU 102 may receive a different value of N for each NC generation whose associated NC PDUs are scheduled for transmission in the PDSCH scheduled by the DCI.

For example, the DCI may include information to identify the type and/or characteristics of the NC PDUs (e.g. systematic NC PDUs, coded NC PDUs, importance of NC PDUs, innovativeness of NC PDUs, redundant NC PDU, etc.) carried in the PDSCH. In one approach, a WTRU 102 may receive (e.g., only) a value of this identifier applicable to one or more NC generations whose associated NC PDUs are scheduled for transmission in the PDSCH scheduled by the DCI. In another approach, a WTRU 102 may be configured to receive a different value of this identifier applicable to each NC generation whose associated NC PDUs are scheduled for transmission in the PDSCH scheduled by the DCI.

In certain representative embodiments, a NC PDU may be defined based on a characteristic of the NC PDU. For example, a characteristic of a NC PDU may refer to the NC PDU being a systematic NC PDU or a non-systematic NC PDU. For example, a characteristic of a NC PDU may refer to a degree of innovation of the NC PDU (e.g., more innovative PDU or less innovative). For example, a characteristic of a NC PDU may refer to a size of a SDU which the NC PDU is associated with. For example, a characteristic of a NC PDU may refer to a size of the NC PDU. For example, a characteristic of a NC PDU may refer to the NC PDU being an erasure correction NC PDU. For example, a characteristic of a NC PDU may refer to the NC PDU being an error correction NC PDU.

In certain representative embodiments, an innovative NC PDU (or a degree of innovation of a NC PDU) may refer to a NC PDU that is linearly independent from previously transmitted and/or received NC PDUs within the context of a given NC generation. The term 'innovative' in relation with NC PDUs is to be understood here as a degree of complexity or differences of the NC PDUs from the previously transmitted and/or received NC PDUs within the context of a given NC generation. For example, a "more-innovative" NC PDU may refer to a NC PDU that includes information about a larger number of input NC SDUs not used for the generation of the previously transmitted or received NC PDUs within the context of a given NC generation. As an example, more-innovative NC PDUs may be used for recovering a larger number of NC SDUs at the receiver. For example, a "less-innovative NC PDU" may refer to a NC PDU that includes information about a smaller number of input NC SDUs not used for the generation of the previously transmitted or received NC PDUs within the context of a given NC generation. As an example, less-innovative NC PDUs may be used for recovering of fewer NC SDUs at the receiver.

In certain representative embodiments, a WTRU may determine any of the following from any of layer 1 (L1) control (e.g., WTRU-specific, WTRU group-specific, or cell-specific DCI), layer (L2) control (e.g., MAC CE), and/or layer 3 (L3) control (e.g., RRC signaling) to determine information used for an enhanced HARQ feedback generation rule.

For example, a WTRU 102 may determine the identifiers and/or sequence numbers of NC generations to be scheduled. For example, the WTRU 102 may receive control information indicating the identifiers and/or sequence numbers of NC generation to be scheduled by upcoming DCIs until the reception of a next control signalling overriding these identifiers and/or sequence numbers.

For example, a WTRU 102 may determine the NC generation size, such as the number of NC SDUs encoded together (e.g., for many-to-many mapping between NC SDUs and NC PDUs) or the number of segments of an NC SDU (e.g., for one-to-many mapping between NC SDUs and NC PDUs).

For example, a WTRU 102 may determine the minimum number of NC PDUs required to recover the NC SDUs of an NC generation (e.g., X).

For example, a WTRU 102 may determine the maximum number of NC generations that can be multiplexed together in a PDSCH transmission. This information may be useful in determining the length of the NC generation identifier field in the scheduling DCI, such as when the NC PDUs from more than one NC generations are multiplexed in a PDSCH transmission.

For example, a WTRU 102 may determine the maximum number of NC PDUs from one NC generation that can be transmitted in a TB in a PDSCH transmission.

For example, a WTRU 102 may determine the types and/or characteristics of NC PDUs carried in a TB in the PDSCH transmission. For example, the WTRU 102 may be configured with a mapping between HARQ processes and the types and/or characteristics of NC PDUs that can be carried by a corresponding HARQ process identified by a HARQ process number.

For example, a WTRU 102 may determine a NC code rate for one or more NC generations (e.g., multiplexed in a PDSCH transmission).

For example, a WTRU 102 may determine the number of NC PDUs to be carried in a TB of a PDSCH transmission.

In certain representative embodiments, a WTRU may track the number of NC PDUs associated with each received NC generation.

In certain representative embodiments, a WTRU may track the accumulated number of successfully received NC PDUs (e.g., denoted as $N_r$) as well as the accumulated number of NC PDUs transmitted from the network (e.g., denoted as $N_t$) for each NC generation. For each NC generation that a WTRU 102 may be expected to receive in a PDSCH, the WTRU 102 may maintain two counters. One counter may be used for tracking $N_r$ and another counter may be used for tracking $N_r$. The initialization value of each counter may be '0'. The WTRU 102 may update the relevant counter for each NC generation upon (e.g., successful) reception of a PDSCH carrying NC PDUs from the associated NC generation.

For example, when the WTRU 102 determines that it is scheduled to receive N NC PDUs associated with an NC generation in a scheduled PDSCH based on the NC generation identifier in the scheduling DCI, the WTRU 102 may update $N_t$ (e.g., the accumulated number of transmitted NC PDUs by the base station for the corresponding NC generation) by adding N to the current value of the counter tracking $N_t$ for that NC generation. If the WTRU 102 successfully decodes the received PDSCH scheduled by the DCI, the WTRU 102 may update $N_r$ (e.g., the accumulated number of successfully received NC PDUs for the NC generation identified by the scheduling DCI) by adding N to the current value of the counter tracking $N_r$ for the corresponding NC generation. However, if the WTRU 102 fails to decode the received PDSCH, the WTRU 102 may not update the counter tracking $N_r$ for the NC generation identified by the scheduling DCI.

Procedures for Generating HARQ Feedback

In certain representative embodiments, a WTRU may generate TB-based HARQ feedback for any received PDSCHs based on an enhanced HARQ feedback generation rule.

In certain representative embodiments, a WTRU may generate TB-based HARQ feedback for the received PDSCHs based on the enhanced HARQ feedback generation rule that may be a function of the decoding status of the received PDSCHs and/or additional scheduling information about the NC PDUs that a WTRU 102 may receive from the network. For example, the WTRU 102 may generate HARQ feedback for the TBs carrying NC PDUs from an NC generation based on any of the following.

For example, if the accumulated number of successfully received NC PDUs (e.g., $N_r$) of the NC generation, identified by the scheduling DCI, is greater than or equal to the minimum number of NC PDUs required to recover the NC SDUs (e.g., X) of the corresponding NC generation (e.g., if $N_r \geq X$), the WTRU 102 may generate TB-based HARQ ACK feedback for TBs associated with the NC generation for the HARQ feedback transmission at the corresponding HARQ feedback transmit occasion.

For example, if the accumulated number of successfully received NC PDUs (e.g., $N_r$) of the NC generation, identified by the scheduling DCI, is less than the minimum number of NC PDUs required to recover the NC SDUs (e.g., X) of the NC generation, and if the total number of NC PDUs, from this NC generation, expected to be received in the following PDSCHs is greater than or equal to the additional number of NC PDUs required to recover the NC SDUs (e.g., if $N_r<X$ and $N_r+Y-N_t \geq X$), the WTRU 102 may generate TB-based HARQ ACK feedback for all the TBs, associated with the NC generation, which WTRU 102 may have been received.

For example, if the accumulated number of successfully received NC PDUs (e.g., $N_r$) of the NC generation identified by the scheduling DCI, is less than the minimum number of NC PDUs required to recover the NC SDUs of the NC generation, and if the total number of NC PDUs that is expected to be received in the following PDSCHs of the NC generation is also less than the additional number of NC PDUs required to recover the NC SDUs (e.g., if $N_r<X$ and $N_r+Y-N_t<X$) for the NC generation, the WTRU 102 may generate TB-based HARQ feedback for the received PDSCHs as follows. The WTRU 102 may determine a TB of the received PDSCH fails when a CRC for the TB fails. For example, the WTRU 102 may consider all of the NC PDUs carried by a failed TB as also failing (e.g., prior to attempting decoding at the PDCP layer). As a first example, the WTRU 102 may generate TB-based HARQ NACK feedback for each of the failed TBs that may be carrying any NC PDUs with a higher importance, (e.g., systematic NC PDUs, more innovative NC PDUs, etc.) until retransmission request for enough NC PDUs has been done (e.g., until $N_r+Y-N_t+N_{reTx}>X$, where $N_{reTx}$ denotes the total number of NC PDUs carried by the PDSCH for which NACK has been generated). As a second example, if not enough retransmission request for NC PDUs has been done (e.g., if $N_r+Y-N_t+N_{reTx}<X$), the WTRU 102 may further generate TB-based HARQ NACK feedback for each of the failed TBs that may be carrying the NC PDUs with lower importance, (e.g., coded NC PDUs, less innovative NC PDUs, etc.) until retransmission request for enough NC PDUs has been done (e.g., until $N_r+Y-N_t+N_{reTx} \geq X$). As a third example, the WTRU 102 may generate TB-based HARQ ACK for each of the remaining TBs.

In certain representative embodiments, a WTRU may generate HARQ feedback for a NC generation. For example, a WTRU 102 may transmit one-bit of ACK feedback for transmission to the network to acknowledge successful reception for the complete NC generation to save the HARQ feedback signaling overhead. For example, the WTRU 102 may (e.g., only) transmit NACK information for a TB that is not received successfully and generate ACK information for reporting to the network only when the NC generation is successfully received.

In certain representative embodiments, a WTRU may generate the HARQ feedback for NC generation after receiving all NC PDUs which the gNB plans to transmit associated with the NC generation (e.g., Y) as indicated by the network.

In certain representative embodiments, a WTRU may generate feedback for the NC generation when the WTRU 102 has successfully received enough NC PDUs required to recover NC SDUs, (e.g., X) associated with the NC generation. The WTRU 102 may indicate to the network that the ACK feedback for the NC generation is due to reception of enough NC PDUs needed to recover the NC SDUs associated with the NC generation. The WTRU 102 may provide this indication to the network explicitly, such as by transmitting an explicit indication with the NC generation ACK feedback, or the WTRU 102 may provide the indication implicitly, such as by transmitting ACK feedback for NC generation using signalling dedicated for NC generation feedback upon reception of enough (e.g., less than Y) NC PDUs needed to recover source NC SDUs.

For example, the WTRU 102 may transmit feedback using PHY layer signalling (e.g., similar to legacy HARQ feedback signalling), a new UCI, and/or the WTRU 102 may transmit feedback in a MAC CE or another higher layer control PDU.

Procedures for Reporting Additional Information to the Network

In certain representative embodiments, a WTRU may report information to the network to adjust a NC coding configuration.

In certain representative embodiments, a WTRU may report information to the network so that the base station (e.g., gNB 180) can adjust NC configuration (e.g., code rate, NC generation size, etc.), such as to avoid wasting system resources. For example, a gNB 180 may send more NC PDUs than are needed by the WTRU 102 in its environment, and feedback from the WTRU 102 to the network may facilitate adjustment of the NC code rate to help utilize system resources more efficiently. For example, the WTRU 102 may report (e.g., on a success ratio of the NC PDUs scheduled by the network) information indicating any of the following:

- a number of successfully received NC PDUs out of total NC PDUs associated with an NC generation initially transmitted by the network (e.g., Y);
- an accumulated number of NC PDUs transmitted by the network for successful reception of a minimum number of NC PDUs required to recover the NC SDUs associated with an NC generation;
- a number of successfully received NC PDUs out of the total NC PDUs transmitted by the network at a pre-configured occasion;
- a number of successfully received NC PDUs at a pre-configured occasion;
- a number of successfully received NC PDUs and the total NC PDUs transmitted by the network at a pre-configured occasion; and/or
- a number of successfully received NC PDUs out of a pre-configured number of NC PDUs transmitted by the network.

In certain representative embodiments, a WTRU may report information to the network using L1/L2 signaling. For example, a WTRU 102 may send the information to the network using L1 control signalling. In some embodiments, a new UCI may be designed for the WTRU 102 to report the information to enable the network adjust the NC configuration. For example, a WTRU 102 may send the information in L2 control signalling (e.g., in a MAC CE designed to send the feedback) to the network to adjust the NC configuration.

In certain representative embodiments, a WTRU may be triggered to report information to the network. For example, the WTRU may send the HARQ feedback and/or additional information to the network based on one or more of the following being satisfied: (i) at (pre)-configured occasions, (ii) after a (pre)-configured number of NC PDUs are transmitted by the network, (iii) after a (pre)-configured number of NC generations are transmitted by the network, (iv) after successfully receiving a minimum NC PDUs required for recovery of the NC SDUs associated with an NC generation, (v) a success ratio reaches a threshold, and/or (vi) after receiving signalling from the network to send feedback on the success ratio.

For example, the WTRU 102 may be configured to report the success ratio at a periodic interval configured by the network.

For example, the WTRU 102 may be configured to report the feedback (e.g., a number of successfully received NC PDUs and/or a success ratio) after a (pre)-configured number of NC PDUs are transmitted by the network.

For example, the WTRU 102 may be configured to report the feedback (e.g., the number of successfully received NC PDUs and/or the success ratio) after a (pre)-configured number of NC generations are transmitted by the network.

For example, the WTRU 102 may be configured to report the feedback (e.g., the number of successfully received NC PDUs, the total number of transmitted NC PDUs, and/or success ratio) after successfully receiving a minimum number of NC PDUs required to recover the NC SDUs associated with an NC generation.

For example, the WTRU 102 may be configured to report the information to the network if the ratio of successfully received NC PDUs to the total transmitted NC PDUs at the WTRU 102 is equal to or greater than a threshold.

For example, the WTRU 102 may be configured to report the information to the network if the ratio of successfully received NC PDUs to the total transmitted NC PDUs at the WTRU 102 is equal to or less than a threshold.

For example, the WTRU 102 may send the feedback to the network after receiving a signal from the network triggering the WTRU 102 to report the information related to the success ratio to the network.

Other Optimizations for DL HARQ

In certain representative embodiments, NC may be employed in association with a HARQ process. For example, the NC may serve as an outer code while a Low-Density Parity Check (LDPC) code may serve as an inner error correction code. In such cases, code continuing to reuse the existing HARQ reporting and retransmission mechanism (e.g., report ACK/NACK for each received CBG based on whether all the CBs within the CBG are successfully decoded or not) becomes inefficient. For example, unnecessary retransmission may be triggered which will cause resource wasting.

In certain representative embodiments, DL HARQ procedures may enhance the HARQ reporting scheme to reduce the HARQ reporting overhead, enhance the retransmission and rescheduling mechanism to reduce the unnecessary retransmission and avoid wasting system resources, and/or enhance the PHY signalling to allow a receiver to perform decoding, such as to determine the coding coefficients used in the NC encoding to enable the NC decoding.

In certain representative embodiments, a WTRU may assume that NC is used as an outer code, and that X code blocks generated by the code block segmentation are NC SDUs (e.g., input to the NC encoder). After NC processing, Y NC PDUs are generated which may be encoded by an LDPC encoder followed by rate matching, code block concatenation, and so forth before DL transmission.

In certain representative embodiments, a WTRU may determine the information used for decoding the NC coded packets (e.g., received NC PDUs). For example, the NC encoding related information may need to be known by the WTRU 102 to perform the correct decoding. For example, the NC coding related information may include any of the following: (i) coefficients used in the NC encoding, (ii) a ratio between input packets and output packets of the NC process, (iii) the number of NC SDUs and/or NC PDUs associated with an NC generation, (iv) Galois field size, and/or (v) a look up table for the Galois field multiplication and addition.

For example, the NC encoder may apply a coding coefficient to each source packet and a coded packet may be a linear combination of the source packets with the applied coefficients. When a WTRU 102 receives NC PDUs, the WTRU 102 may need to know the coefficients to recover the NC SDUs (e.g., source packets) from the successfully received NC PDUs using Gaussian elimination.

For example, the NC encoding rate may refer to the ratio of the number of NC SDUs (e.g., X) over the number of total NC PDUs (e.g., Y).

For example, the NC encoding rate may refer to the ratio of the number of redundant NC PDUs (e.g., Y−X) over the number of NC SDUs (e.g., X).

For example, the NC encoding rate may refer to the ratio of the number of NC SDUs over the number of redundant NC PDUs.

For example, the number of NC SDUs and/or NC PDUs associated with an NC generation may refer to the number of NC SDUs and/or the number of systematic coded packets.

For example, the number of NC SDUs and/or NC PDUs associated with an NC generation may refer to the number of NC PDUs.

For example, the number of NC SDUs and/or NC PDUs associated with an NC generation may refer to the number of redundant NC PDUs (e.g., Y−X).

In certain representative embodiments, a WTRU may determine one or more of the coding coefficients. For example, the WTRU may determine the coefficients used in the NC encoding based on an indication in the DCI scheduling the PDSCH to decode the successfully received NC PDU(s) in the scheduled PDSCH.

For example, coefficient information may be signaled via an indication of the NC generator matrix. Multiple NC generator matrices (e.g., $K_{generator}$) may be pre-defined in a specification and/or may be configured to the WTRU 102 through RRC signaling.

For example, a new field (e.g., a NC generator indication field) with $\lceil \log_2(K_{generator}) \rceil$ bits may be defined in the scheduling DCI to indicate the generator used in the NC encoding. After receiving the DCI, the WTRU 102 may read this DCI field to determine the coefficients used in the NC encoding and use the determined coefficients to decode the successfully received NC PDUs.

In some representative embodiments, $K_{generator}$=8 NC generators may be pre-defined in the specification and/or may be configured by the RRC. For example, a 3-bit NC generator indication field may be defined in the DCI scheduling the PDSCH. Each codepoint represented by these bits may be associated with a pre-defined and/or pre-configured NC generator as shown in Table 1.

TABLE 1

Example of a 3-bit NC generator indication field

| NC generator indication field | NC generator used in the NC encoding |
|---|---|
| 000 | $1^{st}$ NC generator pre-defined in the specification and/or pre-configured by the RRC |
| 001 | $2^{nd}$ NC generator pre-defined in the specification and/or pre-configured by the RRC |
| . . . | . . . |
| 111 | $8^{th}$ NC generator pre-defined in the specification and/or pre-configured by the RRC |

For example, a MAC-CE may be (e.g., additionally) used in signaling the coefficient information. For example, a MAC-CE may indicate the $K_{generator}$ (e.g., a subset $K_{generator,MAC-CE}$, of the pre-specified and/or RRC configured NC generators) to the WTRU 102. For example, the MAC-CE may provide a one to one mapping to the NC generator indication field in the DCI scheduling the PDSCH. The $\lceil \log_2(K_{generator,MAC-CE}) \rceil$ bit DCI field may be defined in the DCI scheduling the PDSCH to indicate the generator used in the NC encoding. After receiving the DCI, the WTRU 102 may read this DCI field to determine the coefficients used in the NC encoding and use it to decode the successfully received NC PDUs.

In another example, a WTRU 102 specific or WTRU 102 group specific NC generator may be indicated via a MAC-CE or another DCI which may be designed to semi-statically or dynamically indicate an NC generator to a WTRU 102 or group of WTRU 102s. A WTRU 102 may use the indicated NC generator to determine the coefficients for decoding the successfully received NC PDUs, such as until a new NC generator may be indicated by MAC CE or DCI.

In certain representative embodiments, a WTRU may determine the ratio between input packets and the output packets.

In certain representative embodiments, a WTRU may receive information to determine the number of NC SDUs and/or the number of the NC PDUs that the WTRU 102 may be receiving in a PDSCH. For example, the information may include any of the following: (i) the ratio of the number of NC PDUs over the number of NC SDUs, (ii) NC code rate (e.g., $R_{NC}$, the ratio of the number of NC SDUs over the number of NC PDUs, (iii) the ratio of the number of redundant NC PDUs over the number of NC SDUs, and/or (iv) the ratio of the number of NC SDUs over the number of redundant NC PDUs.

For example, the WTRU 102 may receive this information from a base station (e.g., gNB 180) through the DCI scheduling the PDSCH and/or RRC signaling. For example, a set of ratio values (e.g., $K_{ratio}$ values) may be configured by the gNB 180 to the WTRU 102 through RRC signaling. The DCI scheduling the PDSCH may contain a new DCI field which has $\lceil \log_2(K_{ratio}) \rceil$ bits (e.g., a NC ratio indication field) to indicate which ratio value is used in the NC encoding. The codepoint of the NC ratio indication field may have a one-to-one association with the RRC configured ratio values. An example is shown in Table 2, where $K_{ratio}$=4 and the NC ratio indication field is indicating the ratio of the number of NC SDUs over the number of NC PDUs.

TABLE 2

Example of a 2-bit NC ratio indication field

| NC ratio indication field | NC code rate used in NC encoding |
|---|---|
| 00 | 1st ratio value configured by the gNB, e.g., $R_{NC} = 4/4$ |
| 01 | 2nd ratio value configured by the gNB, e.g., $R_{NC} = 4/5$ |
| 10 | 3rd ratio value configured by the gNB, e.g., $R_{NC} = 4/6$ |
| 11 | 4th ratio value configured by the gNB, e.g., $R_{NC} = 4/7$ |

For example, when the WTRU 102 receives a DCI scheduling the PDSCH and detects the NC ratio indication field in the DCI is set to '00', the WTRU 102 determines that no network coding is applied in the channel coding, or that network coding is applied in the channel coding such that only systematic coded packets are generated in the encoding and no redundant NC PDUs are generated.

For example, the WTRU 102 may receive this ratio information through a MAC-CE and RRC signaling. For example, the WTRU 102 may be configured with a set of candidate ratio values through the RRC signaling. A MAC-CE may be used to indicate one value from the candidate ratio values to the WTRU 102. The WTRU 102 determines, from the received MAC-CE, the ratio used in the NC encoding and uses it to calculate the number of NC SDUs and/or the number of the NC PDUs the WTRU 102 may be receiving in the PDSCH.

For example, the WTRU 102 may receive ratio information through a combination of the DCI scheduling the PDSCH, the MAC-CE and the RRC signaling. For example, the WTRU 102 may be configured by the gNB with a set of candidate ratio values through the RRC signaling. The MAC-CE may be used to indicate a subset of the ratio values from the candidate ratio values configured by the RRC signaling to the WTRU 102. The DCI scheduling the PDSCH may contain a new DCI field (e.g., NC ratio indication field) to indicate which ratio value is used in the NC encoding. The codepoint of the NC ratio indication field may have a one-to-one association with the ratio values indicated by the gNB through the MAC-CE.

For example, a WTRU 102 specific or WTRU 102 group specific NC code rate information may be indicated via a MAC-CE or another DCI which may be designed to semi-statically or dynamically indicate this information to a WTRU 102 or group of WTRU 102*s*.

In certain representative embodiments, a WTRU may determine the number of NC SDUs, the number of systematic coded packets, the number of NC PDUs, and/or the number of redundant NC PDUs.

For example, after a WTRU 102 receives NC PDUs in a PDSCH transmission, the WTRU 102 needs to determine the number of the NC PDUs and the number of NC SDUs associated with the NC generation to recover the transmitted information.

In certain representative embodiments, a WTRU 102 may determine the number of the NC PDUs and the number of the SDUs associated with an NC generation from the size of the indicated NC generator. For example, the WTRU 102 may determine the number of the NC PDUs based on the number of rows in the NC generator. When the WTRU 102 determines which NC generator is used for an NC generation, the WTRU 102 may determine that the NC generator contains $K_{codeword}$ rows. The WTRU 102 may determine that $K_{codeword}$ NC PDUs are expected to be received in the PDSCH.

The WTRU 102 may determine the number of the NC SDUs based on the number of coefficients in each row of the NC generator. When the WTRU 102 determines that each row of the NC generator includes $K_{coefficient}$ coefficients, the WTRU 102 may determine that $K_{coefficient}$ NC SDUs are expected to be recovered from the successfully received NC PDUs.

In certain representative embodiments, a WTRU 102 may first determine the number of NC SDUs (e.g., X) to be recovered from the NC PDUs successfully received in a PDSCH transmission. Then the WTRU 102 may further determine the number of NC PDUs (e.g., Y) transmitted in the PDSCH. For example, the WTRU 102 may first determine X based on the number of bits carried by the PDSCH, the maximum code block size and the number of CRC bits attached to the TB. The WTRU 102 may further determine Y based on the determined X and the NC code rate $R_{Nc}$. For example, when $R_{Nc}$ is indicated (e.g. in DL scheduling DCI), the WTRU 102 may determine the number of NC PDUs as $Y=X/R_{Nc}$. When the ratio of the number of redundant NC PDUs over the number of source code blocks is indicated in $K_{ratio}$, the WTRU 102 may determine the number of NC PDUs as $Y=X\times(1+K_{ratio})$.

In certain representative embodiments, a WTRU 102 may first determine the number of the NC PDUs in a PDSCH transmission. Then, the WTRU 102 may use the determined number of NC PDUs to further determine the number of the NC SDUs transmitted by the PDSCH. In the first step, the WTRU 102 may determine the number of the NC PDUs in a TB carried in PDSCH (e.g., $N_{NCCB}$) based on the number of bits carried by the PDSCH, the maximum code block size and the number of CRC bits attached to the TB. In determining the bits carried by the PDSCH, the WTRU 102 may further use the aforementioned NC ratio information (e.g., $R_{Nc}$). For example, when determining the quantized intermediate number of information bits of a PDSCH, the WTRU 102 may calculate it as $$N'_{info} = \max\left(3840,\ 2^n \times \text{round}\left(\frac{N_{info} - 24}{2^n}\right)\right),$$

where $N_{info}=N_{RE}\cdot R\cdot R_{NC}\cdot Q_m\cdot v$, where $N_{RE}$ is the total number of Res allocated for PDSCH, R is the target FEC code rate, $Q_m$ is the modulation order, v is the number of transmission layers, and $R_{Nc}$ is the NC code rate. In the second step, the WTRU 102 may determine the number of NC SDUs in the TB received in PDSCH (e.g. $N_{scB}$) based on $N_{NccB}$ and $R_{Nc}$ using $N_{SCB}=N_{NCCB}\cdot R_{NC}$.

In certain representative embodiments, the number of the NC PDUs and the number of NC SDUs may be explicitly indicated to the WTRU 102. For example, the WTRU 102 may be configured with a set of candidate NC PDUs numbers and/or a set of candidate NC SDUs numbers by the gNB through RRC signaling, where each entry may have one-to-one association with the codepoint of a new DCI field. The DCI scheduling the PDSCH may include a DCI field to indicate how many NC PDUs and/or NC SDUs are carried by the scheduled PDSCH.

In certain representative embodiments, a WTRU may provide enhanced ACK/NACK-based and CBG-based HARQ reporting when configured for NC-based PDSCH transmission.

When NC is applied to a PDSCH transmission, since redundant NC PDUs are generated and transmitted, the WTRU 102 may still be able to recover the source information even if some of the NC PDUs are incorrectly received. Since the WTRU 102 may feedback a NACK when any of the code blocks in a CBG are incorrectly received, legacy CBG-based ACK/NACK reporting becomes inefficient as the WTRU 102 may feedback unnecessary NACKs and trigger unnecessary retransmissions following the legacy design. Therefore, ACK/NACK feedback design for NC based PDSCH transmission may be enhanced to improve system efficiency.

In certain representative embodiments, a WTRU may generate CBG-based ACK or NACK for the HARQ information bits for a PDSCH transmission based on the NC decoding related information as discussed herein (e.g., the number of the NC SDUs and the number of the NC PDUs, and based on the number of NC PDUs that are incorrectly received).

In certain representative embodiments, a WTRU may feedback a NACK for a CBG that has the most incorrectly received NC PDUs.

For example, after receiving a PDSCH transmission, the WTRU 102 may group the NC PDUs transmitted in a TB into CBGs. The WTRU 102 may determine the number of correctly received and/or incorrectly received NC PDUs for each CBG. The WTRU 102 may also determine the minimal number of NC PDUs that are required to be correctly received for recovering the source information (e.g., the transmitted information) and/or determine the maximum number of NC PDUs that can be incorrectly received while the WTRU 102 can still recover the source information.

If the WTRU 102 can recover the source information, the WTRU 102 may generate an ACK for all CBGs and send the feedback to the gNB. If the WTRU 102 can't recover the source information, the WTRU 102 may determine how many more NC PDUs are needed to recover the source information. Based on the number determined, the WTRU 102 may generate a NACK for any CBGs that have the most incorrectly received NC PDUs until a total number (e.g., total amount) of the incorrectly received NC PDUs for all the CBGs that have been generated with NACK is greater than or equal to the number of needed remaining NC PDUs (e.g., to recover the source information). The WTRU 102 may generate an ACK for all the remaining CBGs for the received PDSCH and send the feedback to the gNB.

Figure 3:
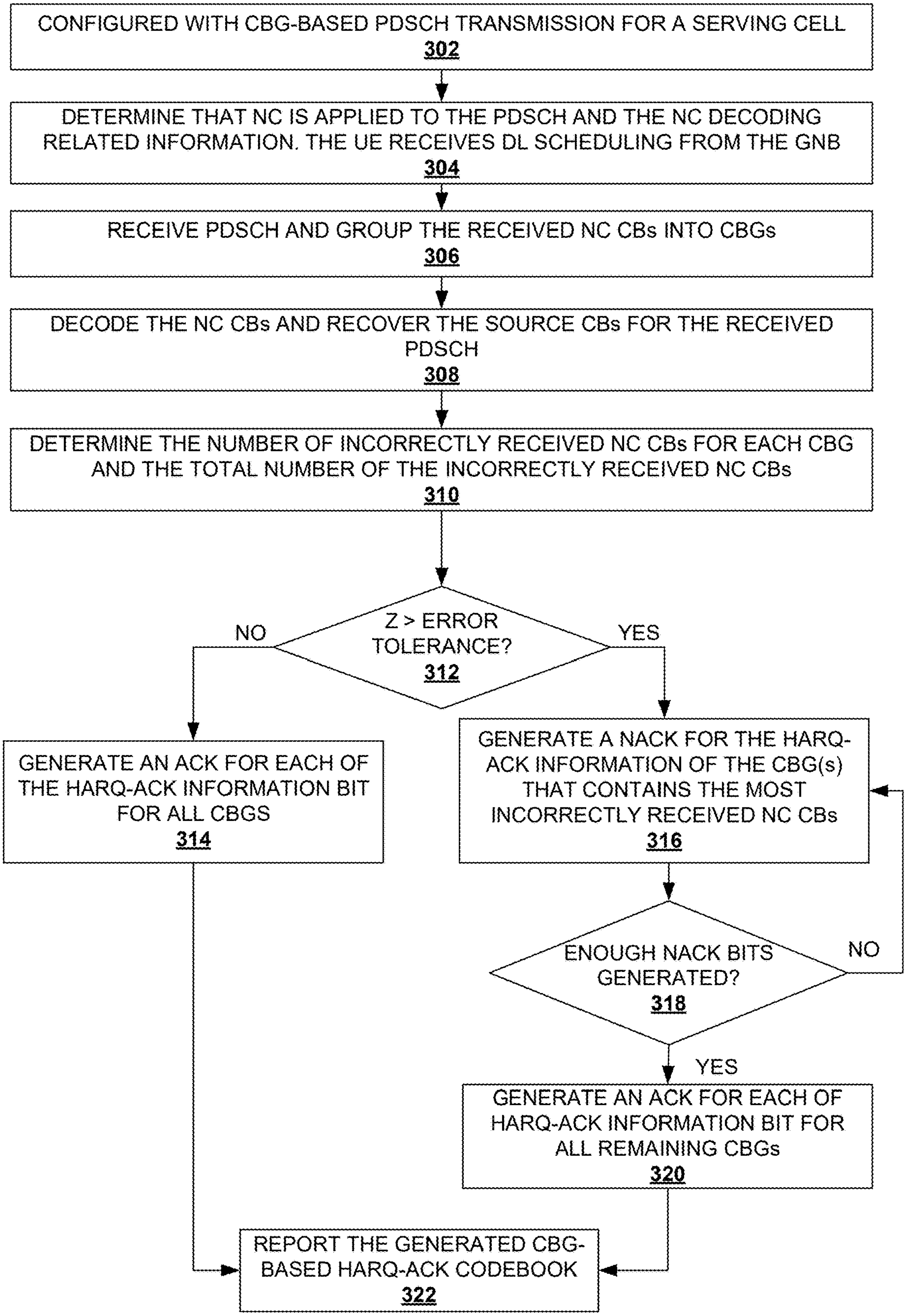
FIG. 3 is a procedural diagram illustrating an example procedure for enhanced ACK/NACK-based HARQ reporting for NC-based PDSCH.

FIG. 3 is a procedural diagram illustrating an example procedure for enhanced ACK/NACK based HARQ reporting for NC-based PDSCH.

In FIG. 3, a WTRU may be configured with CBG-based PDSCH transmission for a serving cell at 302. At 304, the WTRU may determine that NC is applied to the PDSCH. The WTRU 102 may determine the NC decoding related information. The WTRU 102 may receive DL scheduling from the gNB. For example, the WTRU 102 may determine the number of NC SDUs (e.g., X) and the number NC PDUs (e.g., Y) for the scheduled PDSCH. At 306, the WTRU 102 may receive the PDSCH transmission scheduled by the DCI and group the NC PDUs (e.g., NC CBs) transmitted in a TB into CBGs. At 308, the WTUR may use the NC decoding related information to decode the NC PDUs (e.g., NC CBs) and recover the source CBs. At 310, the WTRU 102 may generate the enhanced CBG-based HARQ feedback for the received PDSCH. For example, the WTRU 102 may determine the number of incorrectly received NC PDUs (e.g., NC CBs) for each CBG and the total number of incorrectly received NC PDUs (e.g., denoted as Z). At 312, the WTRU 102 may determine whether the total number of incorrectly received NC PDUs (e.g., Z) is greater than an error tolerance.

At 314, if the WTRU 102 correctly received at least X (out of the Y) NC PDUs, such that the number of incorrectly received NC PDUs is less than or equal to the error tolerance (Y−X) (e.g., if $Z \leq Y-X$), the WTRU 102 may generate an ACK for each of the HARQ-ACK information bits for all CBGs.

At 316, if the WTRU 102 correctly received less than X (out of the Y) NC PDUs, such that the number of incorrectly received NC PDUs is greater than the error tolerance (e.g., $Z > Y-X$), the WTRU 102 may generate a NACK for CBGs containing the most incorrectly received NC PDUs until requesting retransmission for enough NC PDUs. For example, the WTRU 102 may first generate a NACK for the HARQ-ACK information of the CBG that contains the most incorrectly received NC PDUs.

At 318, the WTRU 102 may determine if enough NACK bits have been generated. If the total number of incorrectly received NC PDUs for all the CBGs for which NACK is generated (e.g., denoted as $Z_{NACK}$) is less than the difference between the total number of incorrectly received NC PDUs and the error tolerance (e.g., $Z_{NACK} < Z-(Y-X)$), the WTRU 102 may repeat 316 for the remaining CBGs and checks the condition again (e.g., compare $Z_{NACK}$ and $Z-(Y-X)$).

At 320, if $Z_{NACK}$ is greater than or equal to the difference between the total number of incorrectly received NC PDUs and the error tolerance (e.g., $Z_{NACK} \geq Z-(Y-X)$), the WTRU 102 may generate an ACK for each of the HARQ-ACK information bits for all the remaining CBGs.

At 322, the WTRU 102 may report the generated CBG-based HARQ-ACK codebook to the base station (e.g., gNB 180).

For example, FIG. 3 may be applied where a retransmission contains the same CBG(s) (e.g., may be using the same redundancy version (RV) or may be using a different redundancy version) for which the WTRU 102 has generated the NACK feedback.

In certain representative embodiments, a WTRU may feedback NACK information for a CBG that has the most incorrectly recovered NC SDUs.

In certain representative embodiments, a WTRU may determine which CBGs it will generate NACK feedback for based on the NC SDUs that the WTRU 102 can't recover and based on a linear relationship between the NC SDUs and the NC PDUs. For example, when the WTRU 102 receives a NC-based PDSCH transmission, the WTRU 102 may recover NC SDUs from a correctly received NC code block. The WTRU 102 determines which NC SDUs can't be recovered and determines the NC PDUs that are incorrectly received. The WTRU 102 may determine how many more NC SDUs can be recovered when each CBG is retransmitted. The WTRU 102 may generate a NACK for the CBG(s) from which the most NC SDUs can be recovered if these CBG(s) are retransmitted until all the unrecovered NC SDUs can be recovered by the retransmission. The WTRU 102 may generate an ACK for all the remaining CBG(s) for the received PDSCH and send the feedback to the gNB.

Figure 4:
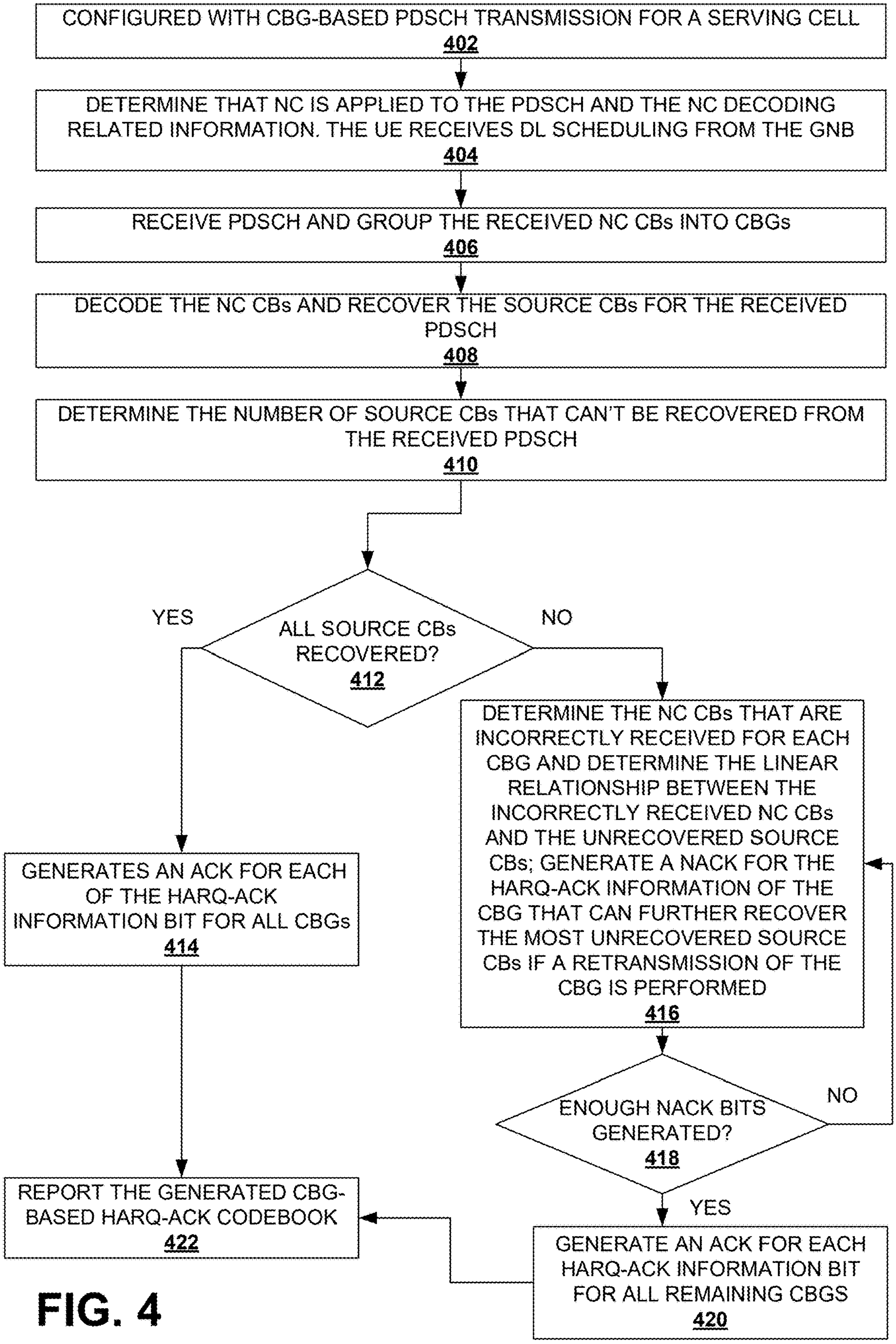
FIG. 4 is a procedural diagram illustrating another example procedure for enhanced ACK/NACK-based HARQ reporting for NC-based PDSCH.

FIG. 4 is a procedural diagram illustrating another example procedure for enhanced ACK/NACK-based HARQ reporting for NC-based PDSCH.

In FIG. 4, a WTRU may be configured with CBG-based PDSCH transmission for a serving cell at 402. At 404, the WTRU may determine that NC is applied to the PDSCH. The WTRU 102 may determine the NC decoding related information. The WTRU 102 may receive DL scheduling from the gNB. For example, the WTRU 102 may determine the number of NC SDUs (e.g., X) and the number NC PDUs (e.g., Y) for the scheduled PDSCH. At 406, the WTRU 102 may receive the PDSCH transmission scheduled by the DCI and group the NC PDUs (e.g., NC CBs) transmitted in a TB into CBGs. At 408, the WTUR may use the NC decoding related information to decode the NC PDUs (e.g., NC CBs) and recover the source CBs. At 410, the WTRU 102 may (e.g., start to) generate the enhanced CBG-based HARQ feedback for the received PDSCH. The WTRU 102 may determine the number of NC SDUs (e.g., NC CBs) that it can't recover (e.g., denoted as $Z_{scB}$) from the received PDSCH. At 412, the WTRU 102 may determine whether all the source PDUs (e.g., source CBs) are recovered.

At 414, if the WTRU 102 recovers all the NC SDUs (e.g., $Z_{ScB}=0$), the WTRU 102 may generate an ACK for each of the HARQ-ACK information bit for all CBGs.

At 416, if the WTRU 102 cannot recover some NC SDUs (e.g., $Z_{scB}>0$), the WTRU 102 may determine the NC PDUs (e.g., NC CBs) that are incorrectly received for each CBG and determine the linear relationship between the incorrectly received NC PDUs and the unrecovered NC SDUs (e.g., source CBs). The WTRU 102 generates a NACK for the HARQ-ACK information of the CBG that can further recover the most unrecovered NC SDUs if a retransmission of the CBG is performed.

At 418, the WTRU 102 determines if enough NACK bits have been generated. For example, if the total number of the additional source PDUs (e.g., CBs) that can be recovered by retransmitting all the CBGs that have been generated with NACK (e.g., denoted as $Z_{NACK}$) is smaller than the $Z_{scB}$ determined at 410 (e.g., $Z_{NACK}<Z_{SCB}$), the WTRU 102 may repeat 418 for the remaining CBGs and compare $Z_{NACK}$ and $Z_{scB}$ again at 418.

At 420, if $Z_{NACK}$ is greater than or equal to the $Z_{scB}$ determined at 410 (e.g., $Z_{NACK}\geq Z_{SCB}$), the WTRU 102 may generate an ACK for each HARQ-ACK information bit for all the remaining CBGs.

At 422, the WTRU 102 may report the generated CBG-based HARQ-ACK codebook to the base station (e.g., gNB 180).

For example, FIG. 4 may applied where the retransmission contains the same CBG(s) (e.g., may be using the same redundancy version or may be using a different redundancy version) which the WTRU 102 has generated the NACK feedback for.

In certain representative embodiments, a WTRU may determine the number of NACKs it needs to generate for a CBG based on the number of NC CBs within one CBG and the number of additional NC CBs that are needed for recovering the source CBs.

In certain representative embodiments, a WTRU may, after receiving a PDSCH transmission, group the NC PDUs (e.g., NC CBs) transmitted in a TB into CBGs. The WTRU 102 may determine the number (e.g., denoted as $N_{NCCB\ per\ CBG}$) of NC CBs within one CBG. The WTRU 102 may determine the number of additional NC CBs that are needed for recovering the NC SDUs (e.g., denoted as M). For example, M may be determined from the number of correctly received and/or incorrectly received NC PDUs for all CBGs and the minimal number of NC PDUs that are required to be correctly received.

In certain representative embodiments, the WTRU 102 may generate $$\left\lceil \frac{M}{N_{NCCB\ per\ CBG}} \right\rceil$$

NACK bits for the CBG-based HARQ feedback for the received PDSCH, where ⌈ ⌉ represents the ceiling function of a real number. For example, assuming 4 CBGs are grouped for a received PDSCH, the WTRU 102 needs to generate a 4-bit bitmap as the HARQ reporting. The WTRU 102 calculates $$\left\lceil \frac{M}{N_{NCCB\ per\ CBG}} \right\rceil$$

and checks its value.

For example, if $$\left\lceil \frac{M}{N_{NCCB\ per\ CBG}} \right\rceil = 0,$$

the WTRU 102 may generate ACK for all CBGs.

For example, if $$\left\lceil \frac{M}{N_{NCCB\ per\ CBG}} \right\rceil = 1,$$

the WTRU 102 may generate a NACK for one CBG and generate ACKs for all the remaining CBGs. For example, the WTRU 102 may generate NACK for the most significant bit (e.g., for the $1^{st}$ CBG). Hence, the generated HARQ feedback may be represented as 'NACK, ACK, ACK, ACK'.

For example, if $$\left\lceil \frac{M}{N_{NCCB\ per\ CBG}} \right\rceil = 2,$$

the WTRU 102 may generate a NACK for two CBGs and generate ACKs for all the remaining CBGs. For example, the WTRU 102 may generate a NACK for the most significate bits (e.g., for the $1^{st}$ CBG and the $2^{nd}$ CBG). Hence, the generated HARQ feedback may be 'NACK, NACK, ACK, ACK'.

For example, similar logic may be applied to other $$\left\lceil \frac{M}{N_{NCCB\ per\ CBG}} \right\rceil$$

values.

For example, the use of $$\left\lceil \frac{M}{N_{NCCB\ per\ CBG}} \right\rceil$$

NACK bits may be applied when a retransmission contains a new set of NC PDUs.

In certain representative embodiments, a WTRU may perform number-based HARQ reporting. For example, number-based HARQ reporting may be used when a WTRU is configured for NC-based PDSCH transmission.

In certain representative embodiments, a WTRU may generate HARQ feedback to indicate the number of NC PDUs that need to be retransmitted and/or the number of NC PDUs that are correctly received for a PDSCH transmission. The WTRU may report the number to the gNB based on the NC decoding related information as described herein (e.g., the number of NC SDUs) and based on the number of NC PDUs that are incorrectly and/or correctly received.

In certain representative embodiments, a WTRU may feedback the number of (e.g., additional) NC PDUs that are needed for the WTRU 102 to recover the NC SDUs. For example, when a WTRU 102 receives a NC-based PDSCH transmission, the WTRU 102 may determine the minimum number of NC PDUs that are required to be correctly received for recovering the NC SDUs and may determine the actual number of correctly received NC PDUs. The WTRU 102 may determine how many additional NC PDUs are needed for the WTRU 102 to recover the NC SDUs and reports this number to the base station (e.g., gNB 180), such as in HARQ reporting.

To report this number (e.g., the number of the additional NC PDUs needed), the WTRU 102 may generate an N-bit information (e.g., NC HARQ reporting), and report it to the gNB using the (e.g., PUCCH and/or PUSCH) resources configured for the HARQ reporting (e.g., as a replacement of the existing legacy ACK/NACK based HARQ reporting). The bit length of the NC HARQ reporting may be a constant value or may be variable. The WTRU 102 may receive signaling from the gNB, such as by any of RRC signaling, MAC-CE, and/or DCI, to determine the value of N.

For a NC-based PDSCH transmission, a WTRU may assume X NC SDUs are carried by the PDSCH transmission. The WTRU 102 needs to receive at least X NC PDUs to recover the NC SDUs. As a result, the number of additional NC PDUs needed can be within the range of [0, X]. To report this information to the gNB 180 using a N-bit NC HARQ reporting, the WTRU 102 may determine a codepoint to feedback for example. The WTRU 102 may divide the range [0, X] into $2^N-1$ ranges, where each range is associated with a codepoint of the NC HARQ reporting. The range [0, X] may be evenly divided, or may be divided unevenly into the $2^N-1$ ranges. When the actual number of additional NC code blocks needed falls into a range, the WTRU 102 may report the corresponding codepoint to the gNB 180. An example of the relationship between the codepoint of the NC HARQ reporting and the corresponding additional NC PDUs needed is shown in Table 3.

TABLE 3

Example of 2-bit NC HARQ reporting

| NC HARQ reporting codepoint | Number of additional NC code blocks needed |
|---|---|
| 00 | No additional NC code block is needed |
| 01 | $\left\lceil \frac{X}{3} \right\rceil$ additional *NC* code blocks are needed |
| 10 | $\left\lceil \frac{2X}{3} \right\rceil$ additional *NC* code blocks are needed |
| 11 | X additional NC code blocks are needed |

Figure 5:
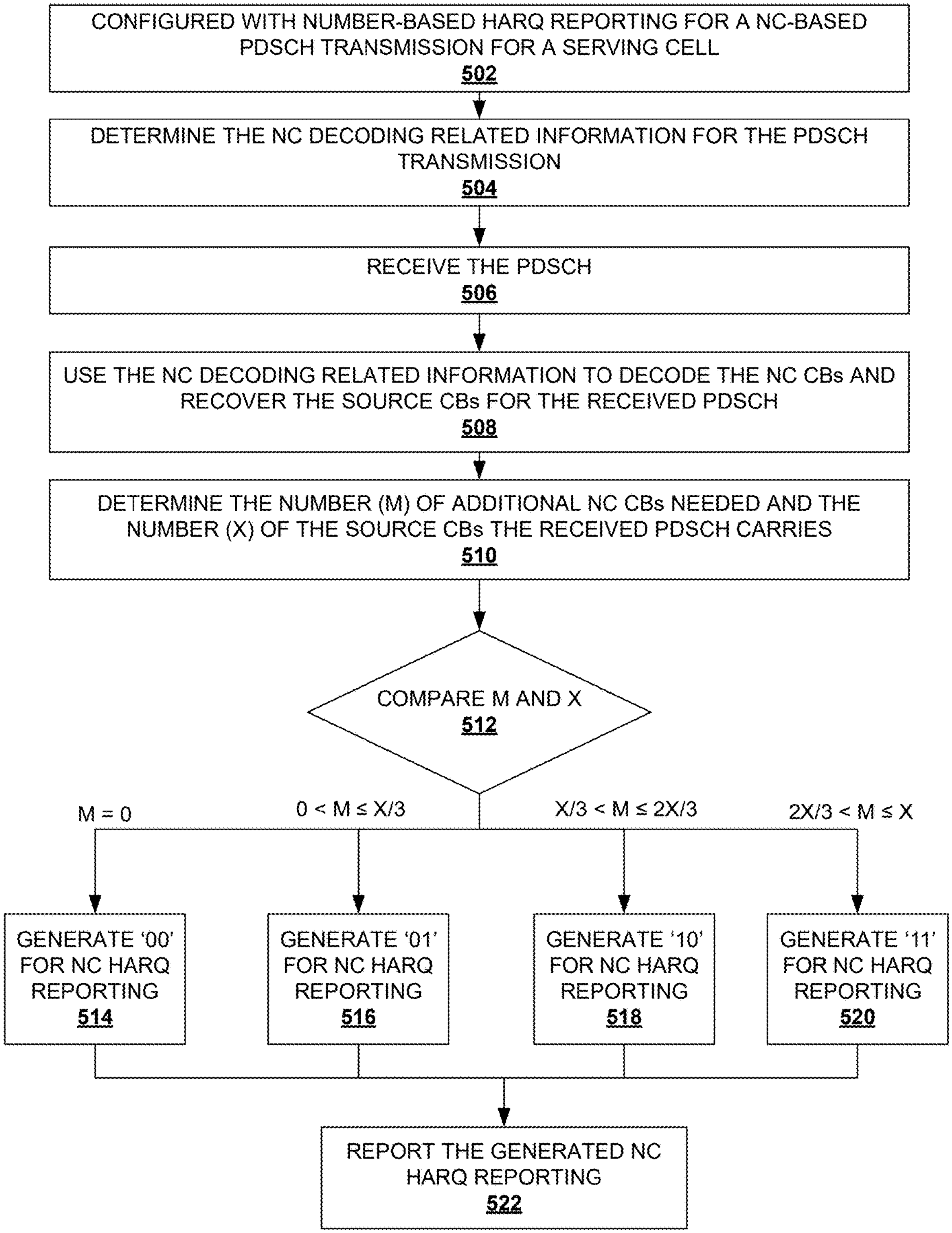
FIG. 5 is a procedural diagram illustrating an example procedure for number-based NC-HARQ reporting for NC-based PDSCH.

FIG. 5 is a procedural diagram illustrating an example procedure for number-based NC-HARQ reporting for NC-based PDSCH. In FIG. 5, a WTRU 102 with configured with number-based HARQ-ACK feedback (e.g., a number of NC PDUs) for NC-based PDSCH for a serving cell at 502. For example, the WTRU 102 may be configured with the number of bits N (e.g., N=2 for example) for the NC HARQ reporting. At 504, the WTRU 102 may determine that NC is applied to a PDSCH transmission. The WTRU 102 may determine the NC decoding related information. For example, the PDSCH may be scheduled by a DCI. At 506, the WTRU 102 receives the PDSCH transmission (e.g., scheduled by the DCI at 504). At 508, the WTRU 102 may use the NC decoding related information to decode the NC PDUs and (e.g., attempt to) recover the NC SDUs. At 510, the WTRU 102 may generate the number-based NC HARQ reporting for the received PDSCH. The WTRU 102 may determine the number (e.g., denoted as M) of the additional NC code blocks that it needs to decode the received PDSCH. The WTRU 102 may determine the number (e.g., denoted as $X_{SCB}$) of the source CBs that the PDSCH carries. At 512, the WTRU 102 may compare M and $X_{SCB}$.

For example, at 514, if M=0, the WTRU 102 may generate a first codepoint, such as all 0s (e.g., '00' when N=2) for the HARQ feedback. For example, this code point may be indicative that no retransmission is needed.

For example, at 516, if $$0 < M \le \frac{X_{SCB}}{2^N - 1},$$

the WTRU 102 may generate a second codepoint, such as a first non all 0s codepoint (e.g., '01' when N=2), for the HARQ feedback. For example, this code point may be indicative that $$\left\lceil \frac{X_{SCB}}{3} \right\rceil$$

additional NU code blocks need to be retransmitted.

For example, at 518, if $$\frac{X_{SCB}}{2^N - 1} < M \le \frac{2X_{SCB}}{2^N - 1},$$

the WTRU 102 may generate a third codepoint, such as a second non all 0s codepoint (e.g., '10' when N=2), for the HARQ feedback. For example, this code point may be indicative that $$\left\lceil \frac{2X_{SCB}}{3} \right\rceil$$

additional NC code blocks need to be retransmitted.

For example, at 520, if $$\frac{(2^N - 2)X_{SCB}}{2^N - 1} < M \le \frac{(2^N - 1)X_{SCB}}{2^N - 1},$$

the WTRU 102 may generate a fourth codepoint, such as a third non all 0s codepoint (e.g., '11' when N=2), for the HARQ feedback. For example, this code point may be indicative that $X_{scB}$ additional NC code blocks need to be retransmitted.

In other examples where Nis greater than 2, additional codepoints may be used.

At 522, the WTRU 102 may report the generated number-based NC HARQ reporting to the base station (e.g., gNB 180).

In certain representative embodiments, a WTRU may perform combined enhanced ACK/NACK and number-based HARQ reporting, such as for a CBG-based PDSCH transmission.

In certain representative embodiments, a WTRU may feedback joint ACK/NACK-based and number-based NC HARQ reporting to a gNB 180 for a NC-based PDSCH transmission.

For example, a WTRU 102 may generate $$\left\lceil \frac{M}{N_{NCCB\ per\ CBG}} \right\rceil$$

NACK bits for CBG-based HARQ feedback for a received PDSCH, where $N_{NCCB\ per\ CBG}$ is the number of NC PDUs within one CBG and M is the number of additional NC PDUs that are needed. The WTRU 102 may further generate and report the number of additional NC PDUs that are needed for recovering the NC SDUs to a base station (e.g., gNB) together with the generated ACK/NACK feedback as the NC HARQ reporting.

For example, assuming 4 CBGs are grouped for a received PDSCH, the NC HARQ reporting may include 2 parts: (i) a 4-bit bitmap to indicate the ACK or NACK information for each CBG and (ii) a N-bit bit string to indicate the number of additional NC code blocks that are needed for recovering the source code blocks. The value of N may be a constant value or may be variable. The WTRU 102 may receive signaling from the base station (e.g., RRC signaling, MAC-CE or DCI) to determine the value of N and therefore determine the number of bits it needs to report for the bit string in the NC HARQ reporting for a NC-based PDSCH. The WTRU 102 may generate a 4-bit ACK or NACK bitmap and the N-bit bit string and then concatenate them together (e.g., 4-bits ACK or NACK bitmap followed by the N-bit bit string, or N-bit bit string followed by the 4-bit ACK or NACK bitmap) to form a full NC HARQ reporting and report the generated NC HARQ reporting. The NC HARQ reporting may be sent to the gNB through the PUCCH and/or PUSCH resources configured for the HARQ reporting. The WTRU 102 may generate the 4-bit ACK or NACK bitmap and the N-bit bit string as follows.

For the ACK or NACK bitmap, the WTRU 102 may generate $$\left\lceil \frac{M}{N_{NCCB\ per\ CBG}} \right\rceil$$

NACK bits for the ACK or NACK bitmap. For example, the WTRU 102 calculates $$\left\lceil \frac{M}{N_{NCCB\ per\ CBG}} \right\rceil$$

and checks its value.

If $$\left\lceil \frac{M}{N_{NCCB\ per\ CBG}} \right\rceil = 0,$$

the WTRU 102 may generate ACK for all CBGs.

If $$\left\lceil \frac{M}{N_{NCCB\ per\ CBG}} \right\rceil = 1,$$

the WTRU 102 may generate a NACK for one CBG and generate ACKs for all the remaining CBGs. For example, the WTRU 102 may generate the NACK for the most significant bit (e.g., for the $1^{st}$ CBG). Then, the generated HARQ feedback is 'NACK, ACK, ACK, ACK'.

If $$\left\lceil \frac{M}{N_{NCCB\ per\ CBG}} \right\rceil = 2,$$

the WTRU 102 may generate NACKs for two CBGs and generate ACKs for all the remaining CBGs. For example, the WTRU 102 may generate NACKs for the most significate bits (e.g., for the $1^{st}$ CBG and the $2^{nd}$ CBG). Then, the generated HARQ feedback is 'NACK, NACK, ACK, ACK'. Similar logic may be applied to other $$\left\lceil \frac{M}{N_{NCCB\ per\ CBG}} \right\rceil$$

values.

For the N-bit bit string, the corresponding $2^N$ codepoints may be used to indicate the range of $[0, N_{NCCB\ per\ CBG}]$. In the ACK or NACK bitmap, each NACK is representing $N_{NCCB\ per\ CBG}$ additional NC PDUs that are needed. However, the value $$\frac{M}{N_{NCCB\ per\ CBG}}$$

may not be an integer. As a result, an additional NACK bit needs to be generated for the bitmap with (e.g., only) M modulo $N_{NCCB\ per\ CBG}$, that is the remainder when M is divided by $N_{NCCB\ per\ CBG}$ additional NC PDUs are needed. The WTRU 102 may use the N-bit bit string to indicate a value of the M modulo $N_{NCCB\ per\ CBG}$ to the gNB as part of the NC HARQ reporting. The WTRU 102 may generate the N-bits bit string as follows.

If $$\left\lceil \frac{M}{N_{NCCB\ per\ CBG}} \right\rceil = 0,$$

the WTRU 102 may generate an arbitrary (e.g., predefined) value for this N-bit bit string.

If $$\left\lceil \frac{M}{N_{NCCB\ per\ CBG}} \right\rceil \geq 1,$$

$$\text{and if } 0 < (M \text{ modulo } N_{NCCB\ per\ CBG}) \leq \frac{N_{NCCB\ per\ CBG}}{2^N},$$

the WTRU 102 may generate a first codepoint (e.g., '00' when N=2) for the N-bit bit string. For example, this codepoint may be indicative that $$\left\lceil\left(\left\lceil\frac{M}{N_{NCCB\ per\ CBG}}\right\rceil-1\right)\cdot N_{NCCB\ per\ CBG}+\frac{N_{NCCB\ per\ CBG}}{2^N}\right\rceil$$

additional NC PDUs need to be retransmitted.

If $$\left\lceil\frac{M}{N_{NCCB\ per\ CBG}}\right\rceil\geq 1,$$

$$\text{and if } \frac{N_{NCCB\ per\ CBG}}{2^N}<(M\text{ modulo }N_{NCCB\ per\ CBG})\leq\frac{2\cdot N_{NCCB\ per\ CBG}}{2^N},$$

the WTRU 102 may generate a second codepoint (e.g., '01' when N=2) for the N-bit bit string. For example, this codepoint may be indicative that $$\left\lceil\left(\left\lceil\frac{M}{N_{NCCB\ per\ CBG}}\right\rceil-1\right)\cdot N_{NCCB\ per\ CBG}+\frac{2\cdot N_{NCCB\ per\ CBG}}{2^N}\right\rceil$$

additional NC PDUs need to be retransmitted.

If $$\left\lceil\frac{M}{N_{NCCB\ per\ CBG}}\right\rceil\geq 1,\text{ and if}$$

$$\frac{(2^N-1)\cdot N_{NCCB\ per\ CBG}}{2^N}<(M\text{ modulo }N_{NCCB\ per\ CBG})\leq N_{NCCB\ per\ CBG},$$

the WTRU 102 may generate a (e.g., last) codepoint (e.g., '11' when N=2) for the N-bit bit string. For example, this codepoint may be indicative that $$\left\lceil\frac{M}{N_{NCCB\ per\ CBG}}\right\rceil\cdot N_{NCCB\ per\ CBG}$$

additional NC PDUs need to be retransmitted.

In other examples where Nis greater than 2, additional codepoints may be used.

In certain representative embodiments, a WTRU may perform combined enhanced ACK/NACK and TB-based HARQ reporting, such as for a NC-based PDSCH transmission.

In certain representative embodiments, a WTRU may feedback TB-based ACK/NACK HARQ reporting to a gNB 180 for a NC-based PDSCH transmission.

For TB-based HARQ reporting, a WTRU 102 may either send a NACK or an ACK for a received PDSCH. Since redundant NC code blocks are generated and transmitted in NC-based PDSCH transmissions, the WTRU 102 may still be able to recover the source information even if some of the NC code blocks are incorrectly received. Therefore, the WTRU 102 may not need to send NACK even if the whole TB is not correctly received. So, the WTRU 102 may generate the ACK or NACK feedback for a TB-based HARQ reporting based on an enhanced feedback generation procedure.

For example, a WTRU 102 may generate the TB-based ACK or NACK for the HARQ information bit for a PDSCH transmission based on the NC-decoding related information (e.g., the number of the NC SDUs and the number of NC PDUs) and based on the number of NC PDUs that are incorrectly received.

Figure 6:
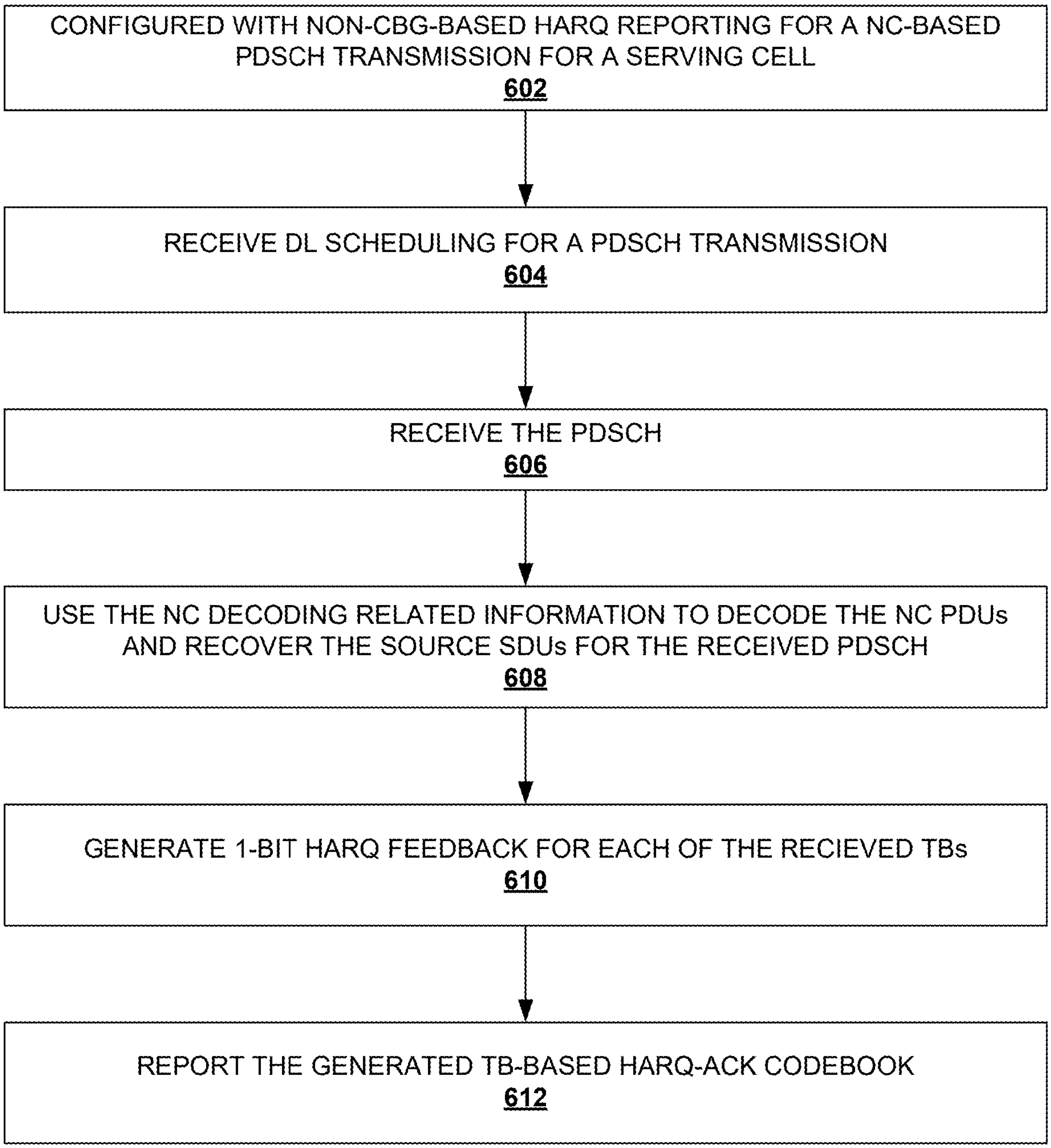
FIG. 6 is a procedural diagram illustrating an example procedure for TB-based ACK/NACK HARQ reporting for a NC-based PDSCH transmission.

FIG. 6 is a procedural diagram illustrating an example procedure for TB-based ACK/NACK HARQ reporting for a NC-based PDSCH transmission. In FIG. 6, a WTRU 102 may determine that it is not configured with CBG-based PDSCH transmission for a serving cell at 602. At 604, the WTRU 102 may receive DL scheduling (e.g., DCI) for a PDSCH transmission from a base station (e.g., gNB 180). The WTRU 102 may determine the NC decoding related information. For example, the WTRU 102 may determine the number of NC SDUs (e.g., denoted as X), and the number of the NC PDUs (e.g., denoted as Y) for the scheduled PDSCH. At 606, the WTRU 102 may receive the PDSCH transmission (e.g., scheduled by the DCI). At 608, the WTRU 102 may use the NC decoding related information to decode the NC PDUs and recover the NC SDUs. At 610, the WTRU 102 may generate 1-bit HARQ feedback for each of the TBs received in the PDSCH. The WTRU 102 may determine the total number of incorrectly received NC code blocks for each TB (e.g., denoted as Z). For example, if the WTRU 102 correctly received at least X NC code blocks, that is the incorrectly received NC code blocks is less than or equal to the error tolerance (e.g., $Z\leq Y-X$), the WTRU 102 may generate an ACK for the TB. For example, if the WTRU 102 correctly received less than X NC code blocks, that is the number of incorrectly received NC code blocks is greater than the error tolerance (e.g., $Z>Y-X$), the WTRU 102 may generate a NACK for the TB. At 612, the WTRU 102 may report the generated TB-based HARQ-ACK codebook to the base station.

In certain representative embodiments, a WTRU may perform adaptation between HARQ reporting schemes (e.g., types) for NC-based PDSCH transmissions. As described herein, various HARQ reporting generation schemes may be used by a WTRU for a NC-based PDSCH transmission. For example, one scheme may be used and the WTRU 102 may use this HARQ reporting generation scheme to generate the HARQ feedback for the received NC-based PDSCH. For example, multiple schemes may be supported. The WTRU 102 may need to determine which HARQ reporting scheme may be used when it receives a NC-based PDSCH transmission.

In certain representative embodiments, a WTRU may determine a HARQ reporting scheme to be used based on an explicit indication (e.g., from a gNB 180).

For example, the WTRU 102 may receive an indication (e.g., as to which HARQ reporting scheme should be used) from a gNB 180. Based on the received indication, the WTRU 102 determines how to generate HARQ feedback for an NC-based PDSCH transmission. The indication may be transmitted using any of RRC signaling, MAC-CE and/or DCI.

For example, a (e.g., new) 1-bit field may be provided in the DCI scheduling the PDSCH. When a WTRU 102 receives the DCI with this field set to '0', the WTRU 102 may determine to use a HARQ reporting scheme associated with this indicated value for the PDSCH. When the WTRU 102 receives the DCI with this field set to '1', the WTRU 102 may determine to use a different HARQ reporting scheme associated with this indicated value for the PDSCH. In some embodiments, these schemes may be pre-defined in the specification. In some embodiments, these schemes may be configured by the gNB through higher layer signaling (e.g., through RRC signaling and/or through MAC-CE).

In certain representative embodiments, a WTRU may determine a HARQ reporting scheme to be used based on an implicit indication.

For example, the WTRU 102 may determine the scheme to be used for HARQ feedback reporting for a NC-based PDSCH based on an association between a HARQ reporting scheme and other information the WTRU 102 has determined.

For example, the WTRU 102 may determine the scheme based on which type of retransmission is performed for the PDSCH. Two types of retransmission schemes may be used and indicated by the gNB for performing the retransmission for the NC-based PDSCH. When the WTRU 102 determines a first type of retransmission (e.g., retransmission type 1) is used, it determines that it may use a first HARQ reporting scheme for the received PDSCH. When a second type of retransmission (e.g., retransmission type 2) is used, the WTRU 102 determine that it may use a second HARQ reporting scheme for the received PDSCH.

In certain representative embodiments, enhancements to PDSCH retransmission may be used. When NC is applied to a PDSCH transmission, a retransmission may be performed in different ways.

For example, the legacy design may be reused (e.g., denoted as retransmission type 1). If the WTRU 102 sends a NACK for a TB or for one or multiple CBGs, that TB or CBG(s) will be retransmitted. The retransmitted TB or CBG(s) may carry the same RV or a different RV for the same information as transmitted in the initial transmission. When the WTRU 102 receives the RV in the retransmission, it utilizes the incremental redundancy and performs soft combining of the initial transmission and retransmission to decode the transmitted information.

For example, the retransmission may utilize the characteristics of the NC. When retransmission is triggered, a new set of NC PDUs may be generated by the gNB and delivered to the WTRU 102 (e.g., denoted as retransmission type 2). When retransmission type 2 is used, the WTRU 102 does not need to keep the buffer for the incorrectly received NC PDUs. After receiving the retransmission, the WTRU 102 may use the newly correctly received NC PDUs, and the buffered NC PDUs for the same HARQ process to perform joint decoding to recover the source NC SDUs. The buffered NC PDUs may be the correctly received NC PDUs in any previous transmissions.

Both types of the retransmission schemes may be supported for NC-based PDSCH. In such examples, the WTRU 102 needs to determine which retransmission type is used by the gNB so the WTRU 102 can perform the proper decoding for the received PDSCH retransmissions.

In certain representative embodiments, a WTRU may determine the retransmission type used based on an explicit indication.

For example, the WTRU 102 may receive an explicit indication (e.g., as to which retransmission type is used) from the gNB 180. Based on the received indication, the WTRU 102 determines the retransmission type to be used and decodes the retransmission correspondingly. The indication may be transmitted using any of RRC signaling, MAC-CE, and/or DCI.

For example, a (e.g., new) 1-bit field may be introduced in the DCI scheduling the PDSCH. When a WTRU 102 receives the DCI with this field set to '0', the WTRU 102 may determine that the retransmission type 1 is used. When the WTRU 102 receives the DCI with this field set to '1', the WTRU 102 may determine the retransmission type 2 is used.

In certain representative embodiments, a WTRU may determine the retransmission type used based on an implicit indication.

For example, the WTRU 102 may determine the retransmission type to be used for the NC-based PDSCH retransmission based on an implicit indication (e.g., a certain association between the retransmission type and other information the WTRU 102 determined).

For example, the WTRU 102 may determine the retransmission type based on which HARQ reporting scheme is performed for the PDSCH. Two HARQ reporting generation schemes may be used and may be indicated to the WTRU 102 by the gNB. When the WTRU 102 determines a HARQ reporting scheme 1 is to be used, it determines that the retransmission type 1 is used for the received PDSCH. When the WTRU 102 determines a HARQ reporting scheme 2 is to be used, it determines that retransmission type 2 is used for the received PDSCH.

Other Example Embodiments

In certain representative embodiments, a WTRU may be configured with TB-based HARQ feedback. The WTRU 102 may receive DL scheduling DCI from the gNB 180 and determine one or more of the following information from the scheduling DCI:

- an identifier and/or sequence number of an NC generation;
- a minimum number of NC PDUs required to recover the NC SDUs of the NC Generation (e.g., X);
- a total number (e.g., total amount) of NC PDUs for the NC generation that the base station plans to transmit to the WTRU 102 (e.g., Y); and/or
- a number of NC PDUs that will be transmitted in the PDSCH scheduled by the DCI, such as for the NC generation whose identifier is indicated by the scheduling DCI (e.g., N).

If the WTRU 102 has no record of the NC generation identifier, the WTRU 102 may perform the following:

- initialize the current accumulated number of successfully received NC PDUs (e.g., $N_r$) for this NC generation to 0; and/or
- initialize the current accumulated number of transmitted NC PDUs by the base station (e.g., $N_t$) for this NC generation to 0.

The WTRU 102 may receive the PDSCH transmission scheduled by the DCI. The WTRU 102 may update the current total number of transmitted NC PDUs by the base station $N_t$ by adding, to the number N, the number of NC PDUs indicated to be transmitted in the PDSCH scheduled by the scheduling DCI for the NC generation whose identifier is indicated by the scheduling DCI.

If the WTRU 102 successfully decodes the received PDSCH scheduled by the DCI, the WTRU 102 may update the current total number of successfully received NC PDUs for the NC generation identified by the scheduling DCI $N_r$, by adding to the number N, the number of NC PDUs indicated as will be transmitted in the PDSCH scheduled by the scheduling DCI for the NC generation whose identifier is indicated by the received scheduling DCI. If the WTRU 102 fails to decode the received PDSCH, the WTRU 102 keeps $N_r$ as current value.

The WTRU 102 may generate TB-based HARQ feedback for the received PDSCH(s) based on enhanced HARQ feedback generation rule(s). Within the current HARQ codebook generation period, the WTRU 102 may:

- if $N_r$ (e.g., the current total number of successfully received NC PDUs generated using the NC generation identified by the scheduling DCI) is greater than or equal to X (e.g., the minimum number of NC PDUs required to recover the NC SDUs of the NC generation identified by the scheduling DCI), generate TB-based HARQ ACK feedback for each TB of all the received TBs associated with the NC generation; or
- if (i) $N_r$ (e.g., the current total number of successfully received NC PDUs of generated using NC generation identified by the scheduling DCI) is less than X (e.g., the minimum number of NC PDUs required to recover the NC SDUs of the NC generation identified by the scheduling DCI), and (ii) $N_r+Y-N_t>X$ (e.g., the total number of NC PDUs that is expected to be received in the following PDSCHs of the NC generation is greater than or equal to the additional number of NC PDUs required to recover the NC SDUs), generate TB-based HARQ ACK feedback for each TB of all the received TBs associated with the NC generation; or
- if (i) $N_r$. (e.g., the current total number of successfully received NC PDUs generated using the NC generation identified by the scheduling DCI) is less than X (e.g., the minimum number of NC PDUs required to recover the NC SDUs of the NC generation identified by the scheduling DCI), and (ii) $N_r+Y-N_t<X$ (e.g., the total number of NC PDUs that is expected to be received in the following PDSCHs of the NC generation is also less than the additional number of NC PDUs required to recover the NC SDUs) for the NC generation), generate TB-based HARQ feedback for the received PDSCHs as follows:
  - generate TB-based HARQ NACK feedback for each TB of the failed TBs that are carrying the NC PDUs with high importance (e.g., systematic packets, innovative packets, etc.) until retransmission requests for enough NC PDUs has been done (e.g., until $N_r+Y-N_t+N_{reTx}\geq X$, where $N_{reTx}$ denotes the total number of NC PDUs carried by the PDSCH for which NACK has been generated);
  - if not enough retransmission requests for NC PDUs has been done (e.g., $N_r+Y-N_t+N_{reTx}<X$), further generate TB-based HARQ NACK feedback for each TB of the failed TBs that are carrying the NC PDUs with low importance (e.g., redundant packets, less innovative packets, non-systematic packets, etc.) until retransmission requests for enough NC PDUs has been done (e.g., until $N_r+Y-N_t+N_{reTx}\geq X$);
  - generate TB-based HARQ ACK for each TB of the remaining TBs.

The WTRU 102 may transmit the generated TB-based HARQ-ACK codebook (e.g., associated with the PDSCH transmission) to the gNB.

In certain representative embodiments, a WTRU may be configured with CBG-based PDSCH transmission for a serving cell. The WTRU 102 may receive DL scheduling (e.g., DCI) from the gNB. The WTRU 102 may determine that NC is applied to a scheduled PDSCH. The WTRU 102 may determine NC decoding related information. For example, the WTRU 102 may determine the number of NC SDUs (e.g., X) and/or the number NC PDUs (e.g., Y) for the scheduled PDSCH. The WTRU 102 may receive the PDSCH transmission scheduled by the DCI, and group the NC PDUs transmitted in a TB into CBGs.

The WTRU 102 may use the NC decoding related information to decode the NC CBs and recover the source CBs.

The WTRU 102 may generate enhanced CBG-based HARQ feedback for the received PDSCH. The WTRU 102 may determine the number of incorrectly received NC PDUs for each CBG and the total number of incorrectly received NC PDUs (e.g., Z).

For example, if the WTRU 102 correctly received at least X (out of the Y) NC PDUs, such that the incorrectly received NC PDUs is less than or equal to the error tolerance (Y−X) (e.g., if $Z\leq Y-X$), the WTRU 102 may generate an ACK for each of the HARQ-ACK information bit for all CBGs.

For example, if the WTRU 102 correctly received less than X (out of the Y) NC PDUs, such that the incorrectly received NC PDUs is greater than the error tolerance (e.g., $Z>Y-X$), the WTRU 102 may generate a NACK for the CBGs containing the most incorrectly received NC PDUs until requesting retransmission for enough NC PDUs. As an example, the WTRU 102 may first generate a NACK for the HARQ-ACK information of the CBG that contains the most incorrectly received NC PDUs. If the total number of incorrectly received NC PDUs for all the CBGs for which NACKs are generated (e.g., $Z_{NACK}$) is less than the difference between the total number of incorrectly received NC PDUs and the error tolerance (e.g., $Z_{NACK}<Z-(Y-X)$, the WTRU 102 may generate a NACK for the CBGs containing the next most incorrectly received NC PDUs and so forth until requesting retransmission for enough NC PDUs by comparing $Z_{NACK}$ and $Z-(Y-X)$ again.

If $Z_{NACK}$ is greater than or equal to the difference between the total number of incorrectly received NC PDUs and the error tolerance (e.g., $Z_{NACK}\geq Z-(Y-X)$), the WTRU 102 may generate an ACK for each of the HARQ-ACK information bit for all the remaining CBGs.

The WTRU 102 may transmits (e.g., reports) the generated CBG-based HARQ-ACK codebook (e.g., associated with the PDSCH transmission) to the gNB.

Figure 7:
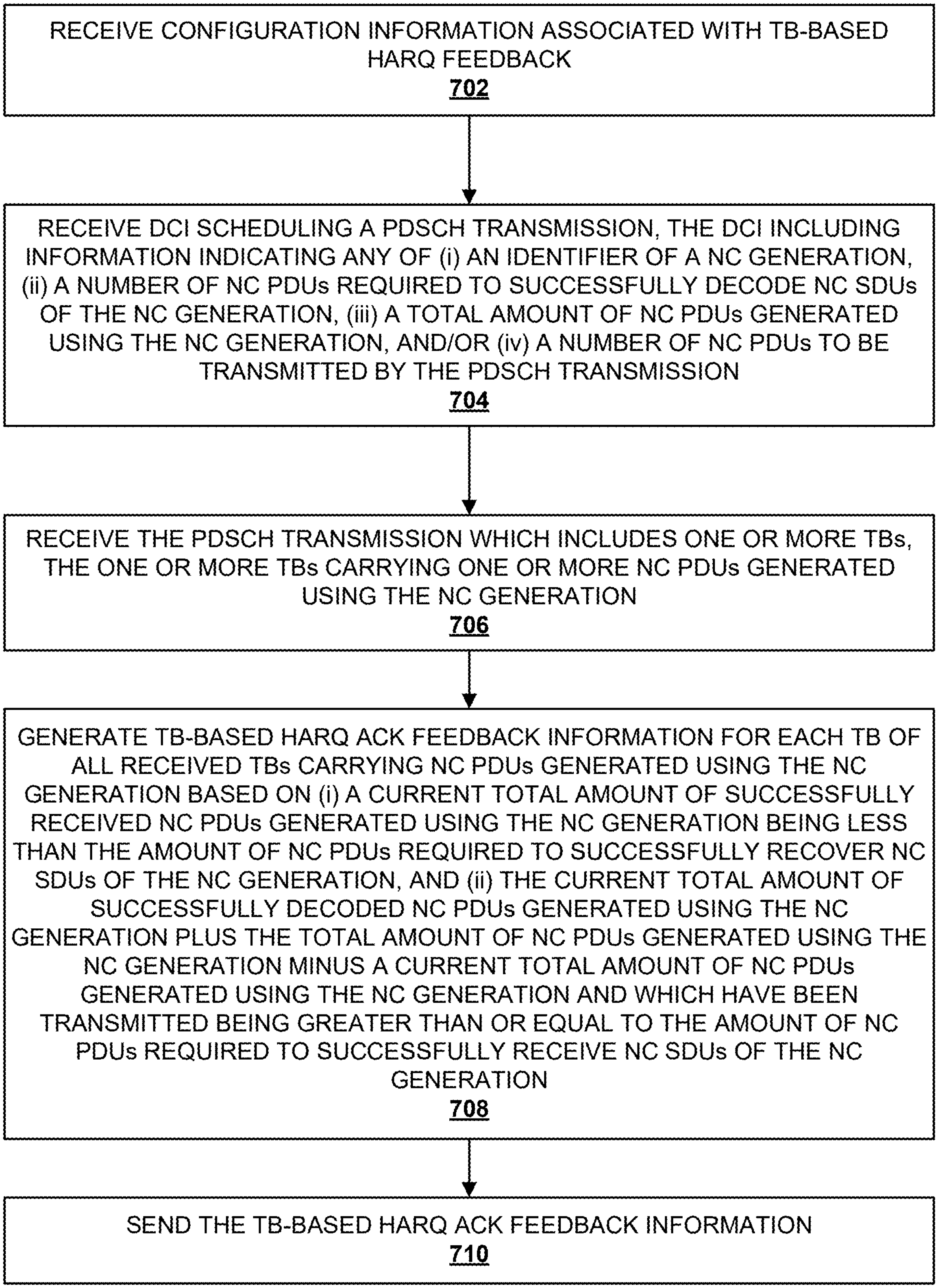
FIG. 7 is a procedural diagram illustrating an example procedure for TB-based HARQ reporting for a PDSCH transmission.

FIG. 7 is a procedural diagram illustrating an example procedure for TB-based HARQ reporting for a PDSCH transmission. In FIG. 7, a WTRU 102 may receive configuration information associated with TB-based HARQ feedback at 702. At 704, the WTRU 102 may receive DCI (or other scheduling information) scheduling a PDSCH transmission. For example, the DCI may include information indicating any of: (i) an identifier of a NC generation, (ii) a number of NC PDUs required to successfully receive (e.g., recover) NC SDUs of the NC generation, (iii) a total amount of NC PDUs generated using the NC generation, and/or (iv) a number of NC PDUs to be transmitted by (e.g., included in) the PDSCH transmission. At 706, the WTRU 102 may receive the PDSCH transmission which includes one or more TBs. For example, the one or more TBs may (e.g., each) carry one or more NC PDUs generated using the NC generation. At 708, the WTRU 102 may generate TB-based HARQ ACK feedback information for each TB of all received TBs carrying NC PDUs generated using the NC generation based on a HARQ feedback generation rule (e.g., as described herein). For example, the TB-based HARQ ACK feedback information may be generated based on (i) a current total amount of successfully decoded NC PDUs generated using the NC generation (e.g., $N_r$) being less than the amount of NC PDUs required to successfully recover NC SDUs of the NC generation (e.g., X), and (ii) the current total amount of successfully decoded NC PDUs generated using the NC generation (e.g., $N_r$) plus the total amount of NC PDUs generated using the NC generation (e.g., Y) minus a current total amount of NC PDUs generated using the NC generation and which have been transmitted (e.g., $N_t$) being greater than or equal to the amount of NC PDUs required to successfully recover NC SDUs of the NC generation (e.g., X). At 710, the WTRU 102 may send the TB-based HARQ ACK feedback information.

In certain representative embodiments, the WTRU 102 may determine a number of additional NC PDUs for retransmission based on the current total amount of successfully received NC PDUs generated using the NC generation and the amount of NC PDUs required to successfully recover the NC SDUs of the NC generation. The WTRU 102 may send (e.g., with the TB-based HARQ ACK feedback information) a codepoint indicating the amount of additional NC PDUs for retransmission.

In certain representative embodiments, the WTRU 102 may determine the current total amount of successfully received (e.g., decoded) NC PDUs generated using the NC generation based on a number of NC PDUs successfully received (e.g., decoded) from the PDSCH transmission and a previous total amount of successfully received (e.g., decoded) NC PDUs generated using the NC generation prior to the PDSCH transmission.

In certain representative embodiments, the WTRU 102 may determine the current total amount of NC PDUs generated using the NC generation and which have been transmitted based on the amount of NC PDUs generated using the NC generation and which are to be transmitted by the PDSCH transmission (e.g., as scheduled) and a previous total amount of NC PDUs generated using the NC generation and which have been transmitted prior to the PDSCH transmission.

In certain representative embodiments, the identifier of the NC generation may be a sequence number (e.g., associated with the NC generation).

In certain representative embodiments, the WTRU 102 may transmit information indicating the current total amount of successfully received (e.g., decoded) NC PDUs generated using the NC generation and/or the current total amount of NC PDUs generated using the NC generation and which have been transmitted. For example, the WTRU 102 may transmit, via UCI and/or MAC CE, the information indicating the current total amount of successfully received (e.g., decoded) NC PDUs generated using the NC generation and/or the current total amount of NC PDUs transmitted for the NC generation.

In certain representative embodiments, the WTRU 102 may receive information indicating a set of NC coefficients associated with (e.g., decoding) the plurality of NC PDUs included in the PDSCH transmission via the DCI and/or MAC CE. For example, the WTRU 102 may decode, using the set of NC coefficients, the received plurality of NC PDUs included in the PDSCH transmission to obtain one or more successfully received (e.g., recovered) NC SDUs from the received plurality of NC PDUs included in the PDSCH transmission.

In certain representative embodiments, the WTRU 102 may receive information indicating a code rate indicating a ratio of the plurality of NC SDUs that form the NC generation to a plurality of NC PDUs generated using the NC generation.

Figure 8:
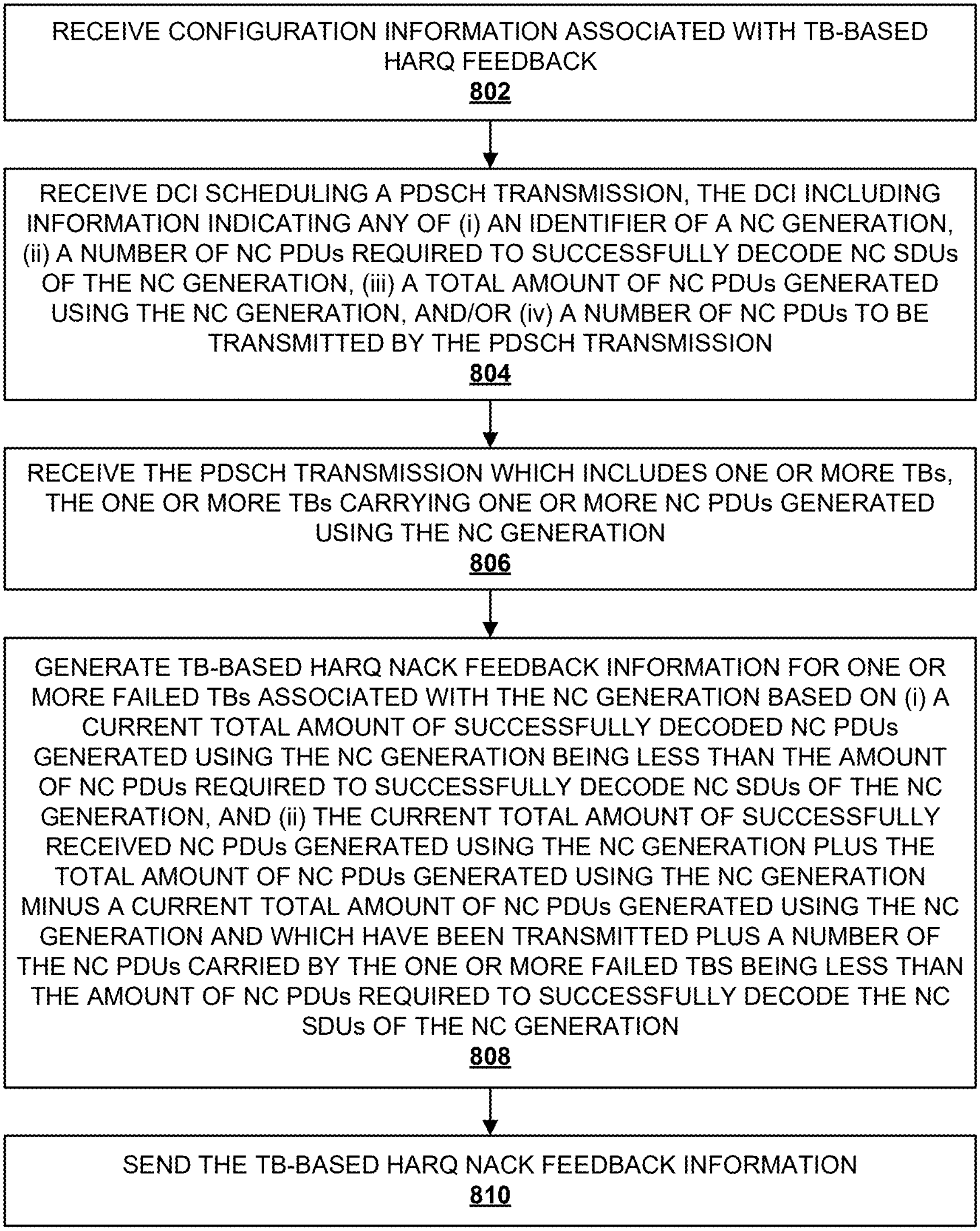
FIG. 8 is a procedural diagram illustrating an example procedure for TB-based HARQ reporting for a PDSCH transmission.

FIG. 8 is a procedural diagram illustrating an example procedure for TB-based HARQ reporting for a PDSCH transmission. In FIG. 8, a WTRU 102 may receive configuration information associated with TB-based HARQ feedback at 802. At 804, the WTRU 102 may receive DCI (or other scheduling information) scheduling a PDSCH transmission. For example, the DCI may include information indicating any of: (i) an identifier of a NC generation, (ii) a number of NC PDUs required to successfully recover NC SDUs of the NC generation, (iii) a total amount of NC PDUs generated using the NC generation, and/or (iv) a number of NC PDUs to be transmitted by the PDSCH transmission. At 806, the WTRU 102 may receive the PDSCH transmission. For example, the PDSCH transmission may include one or more TBs, and the one or more TBs may (e.g., each) carry one or more NC PDUs generated using the NC generation. At 808, the WTRU 102 may generate TB-based HARQ NACK feedback information for one or more failed TBs carrying NC PDUs generated using the NC generation based on a HARQ feedback generation rule (e.g., as described herein). For example, the TB-based HARQ NACK feedback information may be based on (i) a current total amount of successfully decoded NC PDUs generated using the NC generation (e.g., $N_r$) being less than the amount of NC PDUs required to successfully recover NC SDUs of the NC generation (e.g., X), and (ii) the current total amount of successfully decoded NC PDUs generated using the NC generation (e.g., $N_r$) plus the total amount of NC PDUs generated using the NC generation (e.g., Y) minus a current total amount of NC PDUs generated using the NC generation and which have been transmitted (e.g., $N_t$) plus a number of the NC PDUs carried by the one or more failed TBs (e.g., $N_{reTx}$) being less than the amount of NC PDUs required to successfully recover the NC SDUs of the NC generation (e.g., X). At 810, the WTRU 102 may send the TB-based HARQ NACK feedback information.

In certain representative embodiments, the WTRU 102 may perform a cyclic redundancy check (CRC) on each of the one or more TBs to determine the one or more failed TBs.

In certain representative embodiments, the WTRU 102 may determine the NC PDUs carried by the one or more failed TBs may have a first characteristic, such as a first importance type (e.g., systematic packets, innovative packets, etc.).

In certain representative embodiments, the NC PDUs carried by the one or more failed TBs may have different characteristics, such as the first importance type and a second importance type (e.g., redundant packets, less innovative packets, non-systematic packets, etc.).

In certain representative embodiments, the WTRU 102 may generate TB-based HARQ ACK feedback information for each remaining TB of the PDSCH transmission after generating the TB-based HARQ NACK feedback information at 808. For example, the WTRU 102 may send (e.g., with the TB-based HARQ NACK feedback information at 810) the TB-based HARQ ACK feedback information.

In certain representative embodiments, the WTRU 102 may determine a number (e.g., amount) of additional NC PDUs for retransmission based on the current total amount of successfully decoded NC PDUs generated using the NC generation and the amount of NC PDUs required to successfully recover the NC SDUs of the NC generation. The WTRU 102 may send a codepoint indicating the amount of additional NC PDUs for retransmission.

In certain representative embodiments, the WTRU 102 may determine the current total amount of successfully decoded NC PDUs generated using the NC generation based on a number of NC PDUs successfully decoded from the PDSCH transmission and a previous total amount of successfully decoded NC PDUs generated using the NC generation prior to the PDSCH transmission.

In certain representative embodiments, the WTRU 102 may determine the current total amount of NC PDUs generated using the NC generation and which have been transmitted based on the amount of NC PDUs to be transmitted by the PDSCH transmission and a previous total amount of NC PDUs generated using the NC generation and which have been transmitted prior to the PDSCH transmission.

In certain representative embodiments, the identifier of the NC generation may be a sequence number (e.g., associated with the NC generation).

In certain representative embodiments, the WTRU 102 may transmit, via UCI and/or MAC CE, information indicating the current total amount of successfully decoded NC PDUs generated using the NC generation and/or the current total amount of NC PDUs generated using the NC generation and which have been transmitted. For example, the information indicating the current total amount of successfully decoded NC PDUs generated using the NC generation and/or the current total amount of NC PDUs generated using the NC generation and which have been transmitted.

In certain representative embodiments, the WTRU 102 may receive, via DCU and/or MAC CE, information indicating a set of NC coefficients associated with the NC PDUs included in the PDSCH transmission. For example, the WTRU 102 may decode, using the set of NC coefficients, the received NC PDUs included in the PDSCH transmission to obtain one or more successfully recovered NC SDUs from the received NC PDUs included in the PDSCH transmission.

In certain representative embodiments, the WTRU 102 may receive information indicating a code rate indicating a ratio of the plurality of NC SDUs that form the NC generation to a plurality of NC PDUs generated using the NC generation.

Figure 9:
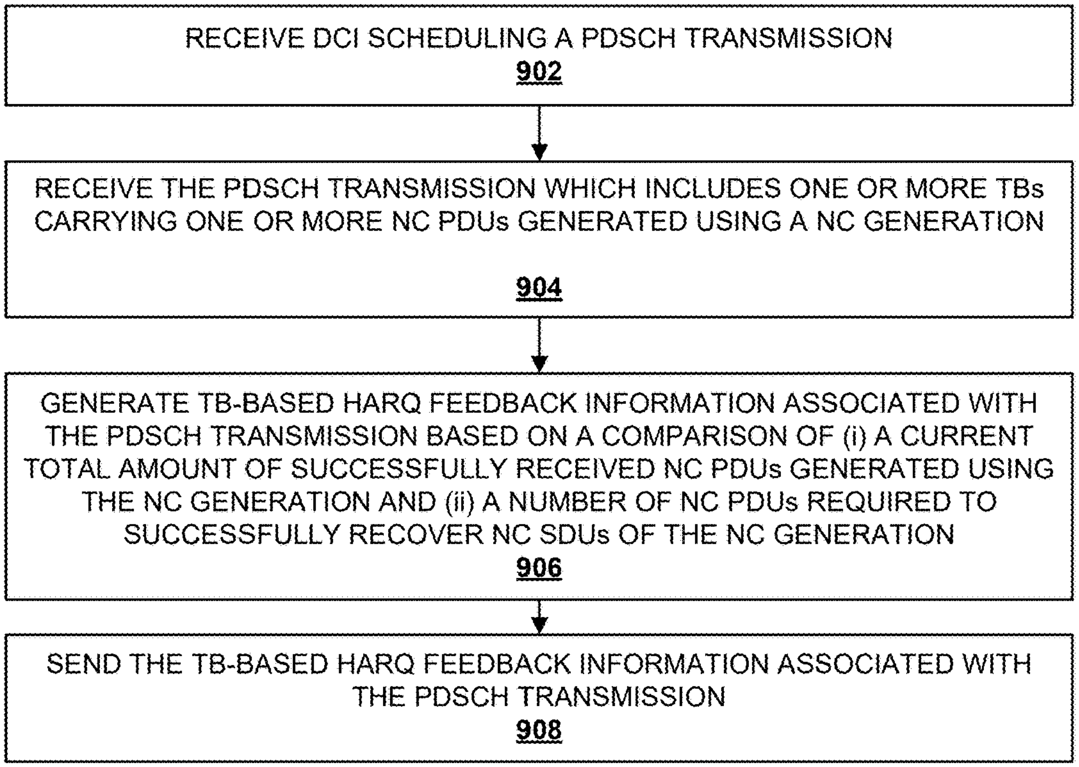
FIG. 9 is a procedural diagram illustrating another example procedure for TB-based HARQ reporting for a PDSCH transmission.

FIG. 9 is a procedural diagram illustrating another example procedure for TB-based HARQ reporting for a PDSCH transmission. In FIG. 9, a WTRU 102 may receive DCI scheduling a PDSCH transmission at 902. At 904, the WTRU 102 may receive the PDSCH transmission which includes one or more TBs carrying one or more NC PDUs generated using a NC generation. At 906, the WTRU 102 may generate TB-based HARQ feedback information associated with the PDSCH transmission based on a HARQ feedback generation rule (e.g., as described herein). For example, the TB-based HARQ feedback information may be generated based on comparison of (i) a current total amount of successfully decoded NC PDUs generated using the NC generation (e.g., $N_r$) and (ii) a number of NC PDUs required to successfully recover NC SDUs of the NC generation (e.g., X). At 908, the WTRU 102 may send the TB-based HARQ feedback information associated with the PDSCH transmission.

In certain representative embodiments, the WTRU 102 may generate TB-based HARQ ACK feedback for each TB of all the received TBs carrying NC PDUs generated using the NC generation.

In certain representative embodiments, the WTRU 102 may generate TB-based HARQ NACK feedback for each TB of the failed TBs that are carrying the NC PDUs with higher importance, such as until $N_r+Y-N_t+N_{reTx}>X$. For example, the WTRU 102 may generate TB-based HARQ ACK feedback for any remaining TBs (e.g., that aren't associated with the generated NACKs).

In certain representative embodiments, the WTRU 102 may generate TB-based HARQ NACK feedback for each TB of the failed TBs that are carrying the NC PDUs with higher importance and then lower importance, such as until $N_r+Y-N_t+N_{reTx}>X$. For example, the WTRU 102 may generate TB-based HARQ ACK feedback for any remaining TBs (e.g., that aren't associated with the generated NACKs).

Figure 10:
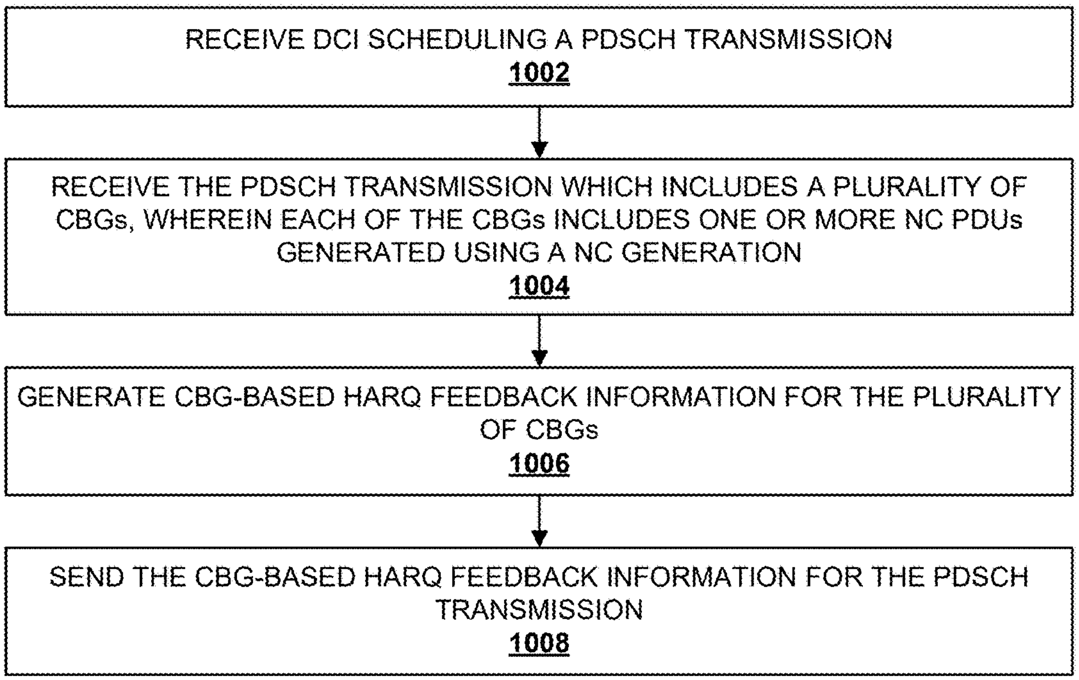
FIG. 10 is a procedural diagram illustrating an example procedure for CBG-based HARQ reporting for a PDSCH transmission.

FIG. 10 is a procedural diagram illustrating an example procedure for CBG-based HARQ reporting for a PDSCH transmission. In FIG. 10, a WTRU 102 may receive DCI (or other scheduling information) scheduling a PDSCH transmission at 1002. At 1004, the WTRU 102 may receive the PDSCH transmission which includes a plurality of CBGs. For example, each of the CBGs may include one or more NC PDUs generated using a NC generation. At 1006, the WTRU 102 may generate CBG-based HARQ feedback information for the plurality of CBGs based on a HARQ feedback generation rule (e.g., as described herein). At 1008, the WTRU 102 may send the CBG-based HARQ feedback information for the PDSCH transmission.

In certain representative embodiments, the WTRU 102 may generate the CBG-based HARQ feedback based on a comparison of (i) a total amount of unsuccessfully decoded NC PDUs generated using the NC generation (e.g., Z) and (ii) a difference between a number of the plurality of NC PDUs included in the PDSCH transmission (e.g., Y) and an amount of NC SDUs of the NC generation (e.g., X). For example, where $Z \le Y-X$, the WTRU 102 may generate an ACK for each of the HARQ-ACK information bits for all CBGs.

In certain representative embodiments, the WTRU 102 may generate the CBG-based HARQ feedback based on a comparison of (i) a total amount of unsuccessfully decoded NC PDUs generated using the NC generation (e.g., Z) and (ii) a difference between a number of the plurality of NC PDUs included in the PDSCH transmission (e.g., Y) and an amount of NC SDUs of the NC generation (e.g., X). For example, where $Z>Y-X$, the WTRU 102 may generate a NACK for the CBGs containing the most incorrectly decoded NC PDUs until retransmissions are requested for enough NC PDUs.

In certain representative embodiments, the WTRU 102 may generate the CBG-based HARQ feedback based on an amount of NC SDUs which are not recovered from decoding the NC PDUs of the PDSCH transmission (e.g., $Z_{scB}$). For example, if $Z_{ScB}=0$, the WTRU 102 may generate an ACK for each of the HARQ-ACK information bit for all of the CBGs of the PDSCH transmission. For example, if $Z_{scB}>0$, the WTRU 102 may generate a NACK for the HARQ-NACK information of each CBG that can further recover the most unrecovered NC SDUs if a retransmission of this CBG is performed, such as until the total number of the additional source SDUs that can be recovered by retransmitting all the CBGs that are associated with NACKs (e.g., $Z_{NACK}$) is greater than or equal to $Z_{scB}$. For example, if $Z_{NACK} \ge Z_{scB}$, the WTRU 102 may generate an ACK for each of the HARQ-ACK information bits for all the remaining CBGs (e.g., which are not associated with a NACK).

In certain representative embodiments, the WTRU 102 may generate the CBG-based HARQ feedback based on an amount of NC code blocks within one CBG (e.g., $N_{NCCB}$ per CBG) and an amount of additional NC PDUs that are needed for recovering NC SDUs of the NC generation (e.g., M). For example, M may be determined from the number of correctly received or incorrectly received NC PDUs for all CBGs and the minimal number of NC PDUs that are required to be correctly received. For example, the WTRU 102 may generate $$\left\lceil \frac{M}{N_{NCCB\ per\ CBG}} \right\rceil$$

NACK bits for the CBG-based HARQ feedback for the received PDSCH.

Figure 11:
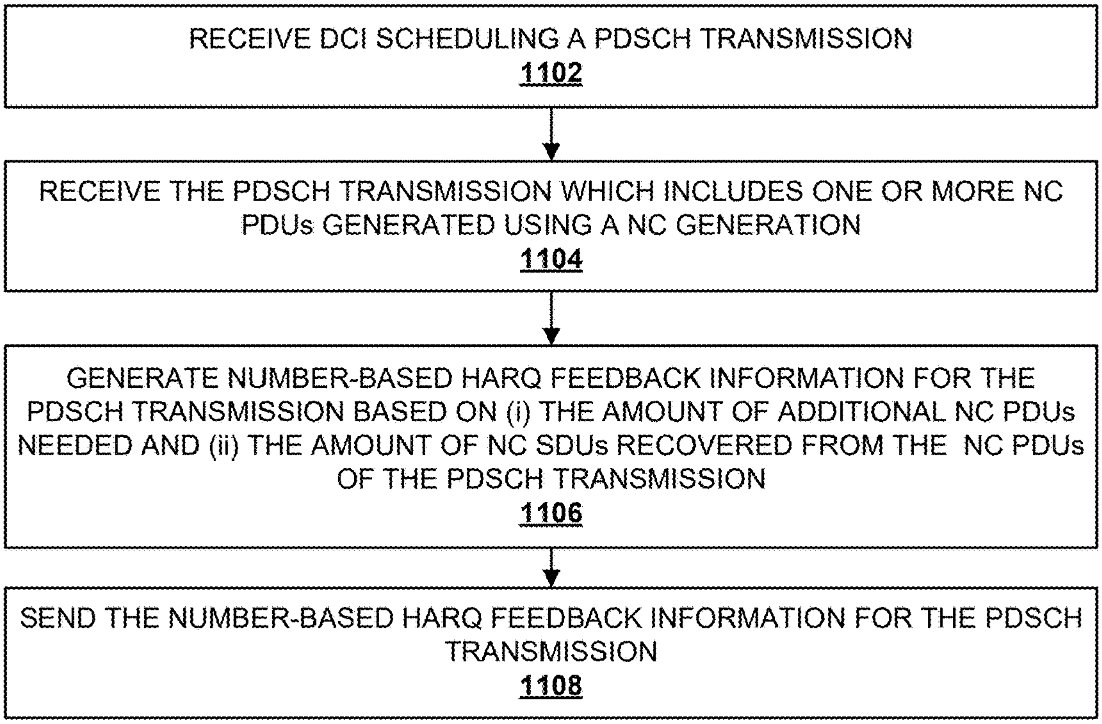
FIG. 11 is a procedural diagram illustrating another example procedure for CBG-based HARQ reporting for a PDSCH transmission.

FIG. 11 is a procedural diagram illustrating another example procedure for CBG-based HARQ reporting for a PDSCH transmission. In FIG. 11, a WTRU 102 may receive DCI scheduling a PDSCH transmission at 1102. At 1104, the WTRU 102 may receive the PDSCH transmission which includes a plurality of CBGs. For example, each of the CBGs may include one or more NC PDUs generated using a NC generation. At 1106, the WTRU 102 may generate number-based HARQ feedback information for the PDSCH transmission based on a HARQ feedback generation rule (e.g., as described herein). For example, the number-based HARQ feedback information may be generated based on (i) the amount of additional NC PDUs needed (e.g., M) and (ii) the amount of NC SDUs recovered from the NC PDUs of the PDSCH transmission (e.g., X). At 1108, the WTRU may send the CBG-based HARQ feedback information for the PDSCH transmission.

In certain representative embodiments, the WTRU 102 may generate the number-based HARQ feedback information as all 0's (e.g., '00' when N=2) if M=0. This may indicate no retransmission is needed.

In certain representative embodiments, the WTRU 102 may generate the number-based HARQ feedback information as a first non-all 0's codepoint (e.g., '01' when N=2) If $$0 < M \le \frac{X_{SCB}}{2^N - 1}.$$

This may indicate $$\left\lceil \frac{X_{SCB}}{3} \right\rceil$$

additional NC code blocks need to be retransmitted.

In certain representative embodiments, the WTRU 102 may generate the number-based HARQ feedback information as a second non-all 0's codepoint (e.g., '10' when N=2) If $$\frac{X_{SCB}}{2^N - 1} < M \le \frac{2X_{SCB}}{2^N - 1}.$$

This may indicate $$\left\lceil \frac{2X_{SCB}}{3} \right\rceil$$

additional NC code blocks need to be retransmitted.

In certain representative embodiments, the WTRU 102 may generate the number-based HARQ feedback information as a third non-all 0's codepoint (e.g., '11' when N=2) if $$\frac{(2^N - 2)X_{SCB}}{2^N - 1} < M \le \frac{(2^N - 1)X_{SCB}}{2^N - 1}.$$

This codepoint may indicate $X_{scB}$ additional NC code blocks need to be retransmitted.

Figure 12:
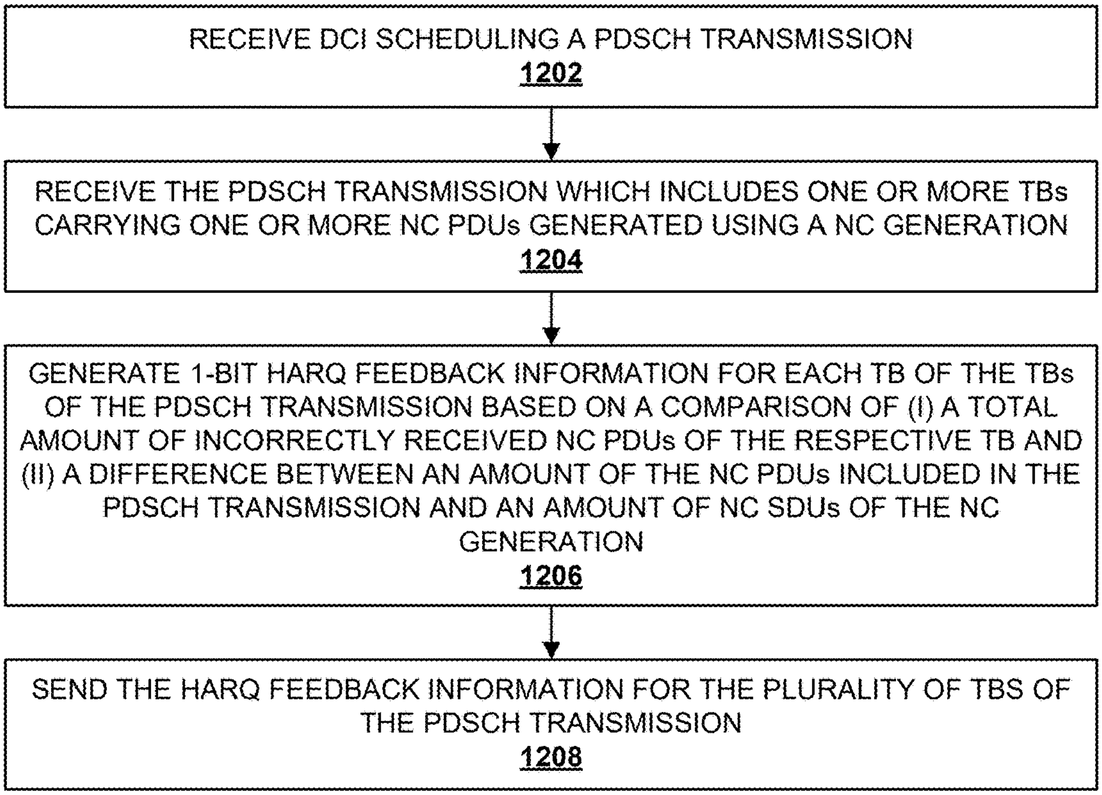
FIG. 12 is a procedural diagram illustrating another example procedure for TB-based HARQ reporting for a PDSCH transmission.

FIG. 12 is a procedural diagram illustrating another example procedure for TB-based HARQ reporting for a PDSCH transmission. In FIG. 12, the WTRU 102 may receive DCI (or other scheduling information) scheduling a PDSCH transmission at 1202. At 1204, the WTRU 102 may receive the PDSCH transmission. For example, the PDSCH transmission may include one or more TBs carrying one or more NC PDUs generated using a NC generation. At 1206, the WTRU 102 may generate 1-bit HARQ feedback information for each TB of the TBs of the PDSCH transmission based on a comparison of (i) a total amount of incorrectly decoded NC PDUs of the respective TB (e.g., Z) and (ii) a difference between an amount of the NC PDUs included in the PDSCH transmission (e.g., Y) and an amount of NC SDUs of the NC generation (e.g., X). At 1208, the WTRU 102 may send the HARQ feedback information for the plurality of TBs of the PDSCH transmission.

In certain representative embodiments, the WTRU 102 may generate an ACK for the respective TB based on the incorrectly received NC code blocks being less than or equal to an error tolerance (e.g., Z≤Y−X).

In certain representative embodiments, the WTRU 102 may generate a NACK for the respective TB based on the incorrectly received NC code blocks being greater than the error tolerance (e.g., Z>Y−X).

Figure 13:
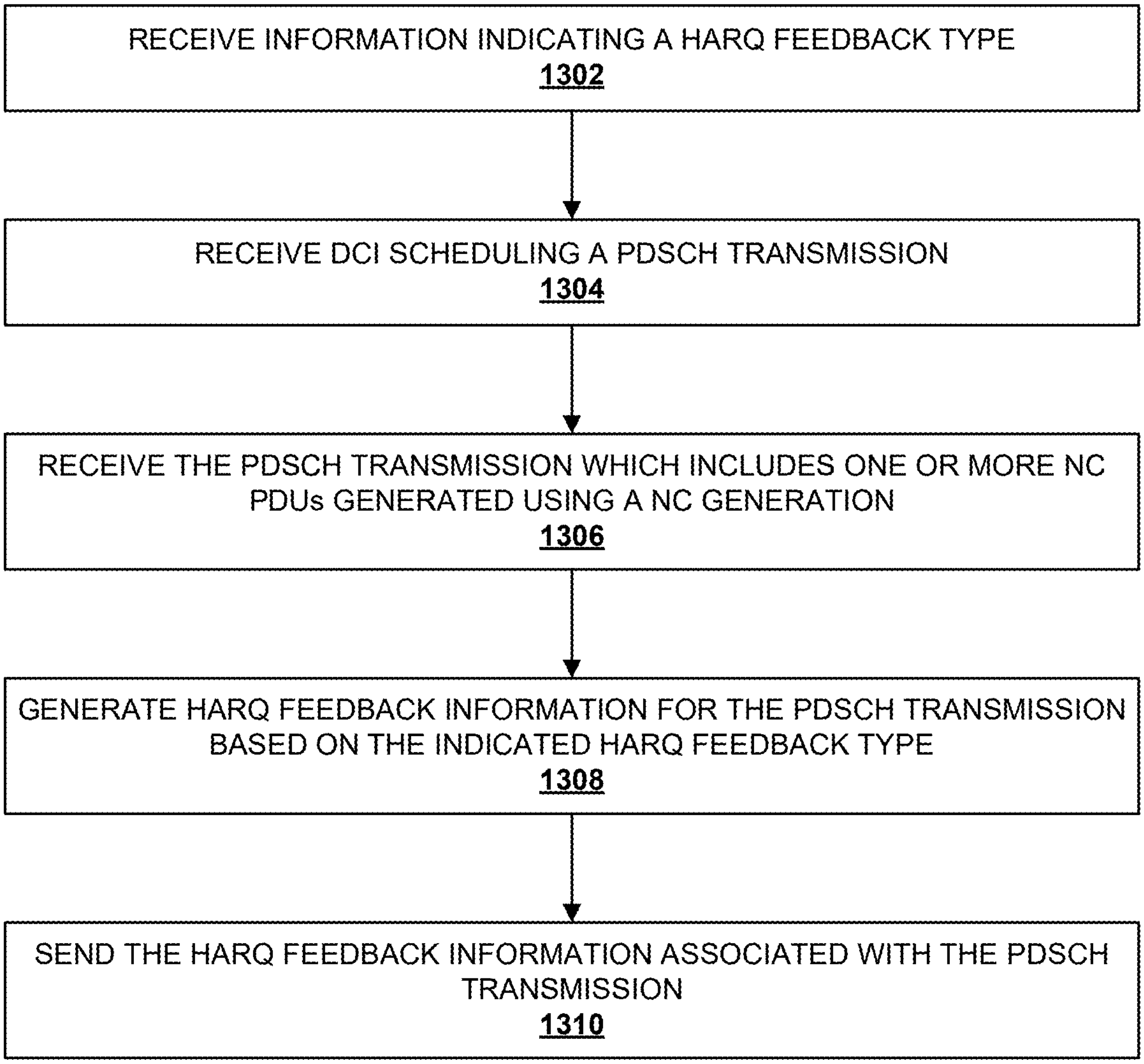
FIG. 13 is a procedural diagram illustrating an example procedure for HARQ reporting for a PDSCH transmission based on an indicated HARQ feedback type.

FIG. 13 is a procedural diagram illustrating an example procedure for HARQ reporting for a PDSCH transmission based on an indicated HARQ feedback type. In FIG. 13, a WTRU 102 may receive information indicating a HARQ feedback type (e.g., a HARQ feedback generation rule) at 1302. At 1304, the WTRU 102 may receive DCI (or other scheduling information) scheduling a PDSCH transmission at 1304. At 1306, the WTRU 102 may receive the PDSCH transmission which includes one or more NC PDUs generated using a NC generation. At 1308, the WTRU 102 may generate HARQ feedback information for the PDSCH transmission based on the indicated HARQ feedback type. For example, the indicated HARQ feedback type may configure the WTRU 102 for TB-based, CBG-based, or other types of HARQ feedback (e.g., as described herein). At 1310, the WTRU 102 may send the HARQ feedback information associated with the PDSCH transmission.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of wireless communication capable devices, (e.g., radio wave emitters and receivers). However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed is:

1. A method implemented by a wireless transmit/receive unit (WTRU), the method comprising:

receiving configuration information associated with transport block (TB)-based hybrid automatic repeat request (HARQ) feedback;

receiving downlink control information (DCI) scheduling a physical downlink shared channel (PDSCH) transmission, the DCI including information indicating: (i) an identifier of a network coding (NC) generation, (ii) a number of NC protocol data units (PDUs) required to successfully recover NC service data units (SDUs) of the NC generation, (iii) a total amount of NC PDUs generated using the NC generation, and (iv) a number of NC PDUs to be transmitted by the PDSCH transmission;

receiving the PDSCH transmission which includes one or more transport blocks (TBs), the one or more TBs carrying one or more NC PDUs generated using the NC generation;

generating TB-based HARQ acknowledgment (ACK) feedback information for each TB of all received TBs carrying NC PDUs generated using the NC generation based on (i) a current total amount of successfully decoded NC PDUs generated using the NC generation being less than the amount of NC PDUs required to successfully recover NC SDUs of the NC generation, and (ii) a sum of the current total amount of successfully decoded NC PDUs and a remaining amount of not-yet-transmitted NC PDUs being greater than or equal to the amount of NC PDUs required to successfully recover NC SDUs of the NC generation, wherein the remaining amount is calculated by subtracting the current total amount of transmitted NC PDUs from the total amount of generated NC PDUs; and sending the TB-based HARQ ACK feedback information.

2. The method of claim 1, further comprising:

determining a number of additional NC PDUs for retransmission based on the current total amount of successfully decoded NC PDUs generated using the NC generation and the amount of NC PDUs required to successfully recover the NC SDUs of the NC generation; and sending a codepoint indicating the amount of additional NC PDUs for retransmission.

3. The method of claim 1, further comprising:

determining the current total amount of successfully decoded NC PDUs generated using the NC generation based on a number of NC PDUs successfully decoded from the PDSCH transmission and a previous total amount of successfully decoded NC PDUs generated using the NC generation prior to the PDSCH transmission.

4. The method of claim 1, further comprising:

determining the current total amount of NC PDUs generated using the NC generation and which have been transmitted based on the amount of NC PDUs generated using the NC generation and which are to be transmitted by the PDSCH transmission and a previous total amount of NC PDUs generated using the NC generation and which have been transmitted prior to the PDSCH transmission.

5. The method of claim 1, wherein the identifier of the NC generation is a sequence number.

6. The method of claim 1, further comprising:

transmitting information indicating the current total amount of successfully decoded NC PDUs generated using the NC generation and/or the current total amount of NC PDUs generated using the NC generation and which have been transmitted.

7. The method of claim 6, wherein the transmitting of the information indicating the current total amount of successfully decoded NC PDUs generated using the NC generation and/or the current total amount of NC PDUs generated using the NC generation and which have been transmitted is via uplink control information (UCI) and/or a medium access control control element (MAC CE).

8. The method of claim 1, further comprising:

receiving, via the DCI and/or a medium access control element (MAC CE), information indicating a set of NC coefficients associated with the plurality of NC PDUs included in the PDSCH transmission.

9. The method of claim 8, further comprising:

decoding, using the set of NC coefficients, the received plurality of NC PDUs included in the PDSCH transmission to obtain one or more successfully recovered NC SDUs from the received plurality of NC PDUs included in the PDSCH transmission.

10. The method of claim 1, further comprising:

receiving information indicating a code rate, the code rate representing a ratio of the plurality of NC SDUs that form the NC generation to a plurality of NC PDUs generated using the NC generation.

11. A wireless transmit/receive unit (WTRU) comprising:

a processor, memory, and a transceiver which are configured to:

receive configuration information associated with transport block (TB)-based hybrid automatic repeat request (HARQ) feedback, receive downlink control information (DCI) scheduling a physical downlink shared channel (PDSCH) transmission, the DCI including information indicating: (I) an identifier of a network coding (NC) generation, (ii) a number of NC protocol data units (PDUs) required to successfully recover NC service data units (SDUs) of the NC generation, (iii) a total amount of NC PDUs generated using the NC generation, and (iv) a number of NC PDUs to be transmitted by the PDSCH transmission, receive the PDSCH transmission which includes one or more transport blocks (TBs), the one or more TBs carrying one or more NC PDUs generated using the NC generation, generate TB-based HARQ acknowledgment (ACK) feedback information for each TB of all received TBs carrying NC PDUs generated using the NC generation based on (I) a current total amount of successfully decoded NC PDUs generated using the NC generation being less than the amount of NC PDUs required to successfully recover NC SDUs of the NC generation, and (ii) a sum of the current total amount of successfully decoded NC PDUs and a remaining amount of not-yet-transmitted NC PDUs being greater than or equal to the amount of NC PDUs required to successfully recover NC SDUs of the NC generation, wherein the remaining amount is calculated by subtracting the current total amount of transmitted NC PDUs from the total amount of generated NC PDUs, and send the TB-based HARQ ACK feedback information.

12. The WTRU of claim 11, wherein the processor, memory, and the transceiver are configured to:

determine a number of additional NC PDUs for retransmission based on the current total amount of successfully decoded NC PDUs generated using the NC generation and the amount of NC PDUs required to successfully recover the NC SDUs of the NC generation, and send a codepoint indicating the amount of additional NC PDUs for retransmission.

13. The WTRU of claim 11, wherein the processor, memory, and the transceiver are configured to:

determine the current total amount of successfully decoded NC PDUs generated using the NC generation based on a number of NC PDUs successfully decoded from the PDSCH transmission and a previous total amount of successfully decoded NC PDUs generated using the NC generation prior to the PDSCH transmission.

14. The WTRU of claim 11, wherein the processor, memory, and the transceiver are configured to:

determine the current total amount of NC PDUs generated using the NC generation and which have been transmitted based on the amount of NC PDUs generated using the NC generation and which are to be transmitted by the PDSCH transmission and a previous total amount of NC PDUs generated using the NC generation and which have been transmitted prior to the PDSCH transmission.

15. The WTRU of claim 11, wherein the identifier of the NC generation is a sequence number.

16. The WTRU of claim 11, wherein the processor, memory, and the transceiver are configured to:

transmit information indicating the current total amount of successfully decoded NC PDUs generated using the NC generation and/or the current total amount of NC PDUs generated using the NC generation and which have been transmitted.

17. The WTRU of claim 16, wherein the processor, memory, and the transceiver are configured to transmit, via uplink control information (UCI) and/or a medium access control element (MAC CE), the information indicating the current total amount of successfully decoded NC PDUs generated using the NC generation and/or the current total amount of NC PDUs generated using the NC generation and which have been transmitted.

18. The WTRU of claim 11, wherein the processor, memory, and the transceiver are configured to:

receive, via uplink control information (UCI) and/or a medium access control element (MAC CE), information indicating a set of NC coefficients associated with the plurality of NC PDUs included in the PDSCH transmission.

19. The WTRU of claim 18, wherein the processor, memory, and the transceiver are configured to:

decode, using the set of NC coefficients, the received plurality of NC PDUs included in the PDSCH transmission to obtain one or more successfully recovered NC SDUs from the received plurality of NC PDUs included in the PDSCH transmission.

20. The WTRU of claim 11, wherein the processor, memory, and the transceiver are configured to:

receive information indicating a code rate, the code rate representing a ratio of the plurality of NC SDUs that form the NC generation to a plurality of NC PDUs generated using the NC generation.

* * * * *